(12) United States Patent
Shimokawa et al.

(10) Patent No.: US 11,005,350 B2
(45) Date of Patent: May 11, 2021

(54) PERMANENT-MAGNET SYNCHRONOUS MOTOR, METHOD FOR MANUFACTURING PERMANENT-MAGNET SYNCHRONOUS MOTOR, AND AIR CONDITIONER

(71) Applicant: Mitsubishi Electric Corporation, Tokyo (JP)

(72) Inventors: Takaya Shimokawa, Tokyo (JP); Kazuhiko Baba, Tokyo (JP); Koji Yabe, Tokyo (JP); Tomoaki Oikawa, Tokyo (JP); Mineo Yamamoto, Tokyo (JP); Hiroyuki Ishii, Tokyo (JP); Junichiro Oya, Tokyo (JP); Hiroki Aso, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 515 days.

(21) Appl. No.: 15/757,391

(22) PCT Filed: Sep. 18, 2015

(86) PCT No.: PCT/JP2015/076744
§ 371 (c)(1),
(2) Date: Mar. 5, 2018

(87) PCT Pub. No.: WO2017/046953
PCT Pub. Date: Mar. 23, 2017

(65) Prior Publication Data
US 2019/0028009 A1    Jan. 24, 2019

(51) Int. Cl.
*H02K 29/08* (2006.01)
*F24F 1/0003* (2019.01)
(Continued)

(52) U.S. Cl.
CPC ........... *H02K 29/08* (2013.01); *F04D 29/043* (2013.01); *F24F 1/0003* (2013.01); *F24F 5/00* (2013.01);
(Continued)

(58) Field of Classification Search
CPC ......... H02K 29/08; H02K 15/03; H02K 21/14
(Continued)

(56) References Cited

U.S. PATENT DOCUMENTS 7,411,329 B2 * 8/2008 Murakami ............. H02K 21/16
310/156.38

FOREIGN PATENT DOCUMENTS

| CN | 201178367 Y | 1/2009 |
|---|---|---|
| EP | 2 503 154 A2 | 9/2012 |

(Continued)

OTHER PUBLICATIONS

Office action dated Jun. 5, 2019 issued in corresponding CN patent application No. 201580082968.6 (and English machine translation).
(Continued)

*Primary Examiner* — Terrance L Kenerly
(74) *Attorney, Agent, or Firm* — Posz Law Group, PLC

(57) ABSTRACT

A permanent-magnet synchronous motor includes: an annular stator core; a cylindrical rotor disposed inside the stator core, and having a first end face in an axial direction of the stator core and a second end face in the axial direction; a disk-shaped sensor magnet having a plurality of magnetic poles disposed circumferentially, and having a third end face and a fourth end face; and a magnetic sensor disposed so as to be opposed to the fourth end face in the axial direction, and detecting a rotating position of the sensor magnet. When a first thickness means the axial thickness at the center of each of the magnetic poles and a second thickness means the axial thickness of an inter-magnetic-pole portion between
(Continued)

adjacent magnetic poles of the magnetic poles, the second thickness is greater than the first thickness.

18 Claims, 28 Drawing Sheets

(51) Int. Cl.
| | |
|---|---|
| *H02K 11/215* | (2016.01) |
| *H02K 21/14* | (2006.01) |
| *F04D 29/043* | (2006.01) |
| *F24F 5/00* | (2006.01) |
| *H02K 1/14* | (2006.01) |
| *H02K 1/27* | (2006.01) |
| *H02K 15/03* | (2006.01) |

(52) U.S. Cl.
CPC ........... *H02K 1/146* (2013.01); *H02K 1/2706* (2013.01); *H02K 11/215* (2016.01); *H02K 21/14* (2013.01); *H02K 15/03* (2013.01)

(58) Field of Classification Search
USPC ........................................................... 310/152
See application file for complete search history.

(56) References Cited

FOREIGN PATENT DOCUMENTS

| | | | | |
|---|---|---|---|---|
| JP | S63-44675 U | 3/1988 | | |
| JP | 2004-023905 A | 1/2004 | | |
| JP | 3748037 B2 | 12/2005 | | |
| JP | 2012-205421 A | 10/2012 | | |
| JP | 2012251843 | * 12/2012 | ............. | G01D 5/245 |
| JP | H02280642 | * 12/2012 | ............... | H02K 1/27 |
| JP | 2013-201858 A | 10/2013 | | |

OTHER PUBLICATIONS

International Search Report of the International Searching Authority dated Dec. 8, 2015 for the corresponding nternational application No. PCT/JP2015/076744 (and English translation).

\* cited by examiner

100

100

100

100

100

PERMANENT-MAGNET SYNCHRONOUS MOTOR, METHOD FOR MANUFACTURING PERMANENT-MAGNET SYNCHRONOUS MOTOR, AND AIR CONDITIONER

CROSS REFERENCE TO RELATED APPLICATION

This application is a U.S. national stage application of International Patent Application No. PCT/JP2015/076744 filed on Sep. 18, 2015, the disclosure of which is incorporated herein by reference.

TECHNICAL FIELD

The present invention relates to a permanent-magnet synchronous motor including an annular stator and a rotor disposed inside the stator, a method for manufacturing a permanent-magnet synchronous motor, and an air conditioner.

BACKGROUND

A conventional permanent-magnet synchronous motor described in Patent Literature 1 uses a stator formed by integrally combining an annular iron core provided with a coil thereon, a magnetic sensor for detecting a magnetic flux in an axial direction of the iron core, and a substrate on which the magnetic sensor is attached, using a thermosetting resin material. A rotor is inserted inside the stator, while the rotor is composed of an annular main magnetic pole portion that is a main magnet generating rotation, and a position detection magnetic pole portion that is a sensor magnet disposed on an end portion on the substrate side of the main magnetic pole portion in an axial direction of the main magnetic pole portion to inform the magnetic sensor of the position of a magnetic pole of the main magnet.

The main magnet has multiple magnetic poles having alternating polarity in a circumferential direction. The sensor magnet has the same number of magnetic poles as the main magnet, the magnetic poles being subjected to magnetic field orientation. Positions of the multiple magnetic poles of the sensor magnet in a circumferential direction correspond to positions of the multiple magnetic poles of the main magnet in a circumferential direction, respectively. This configuration has allowed the magnetic sensor to determine, through the sensor magnet, the magnetic pole position at the time of rotation of the main magnet.

PATENT LITERATURE

Patent Literature 1: Japanese Patent No. 3748037

In the conventional permanent-magnet synchronous motor described in Patent Literature 1, the sensor magnet has a circumferentially ununiform thickness in the axial direction of the magnet. Therefore, magnetic field from an inter-magnetic-pole portion between adjacent magnetic poles up to a magnetic pole center adjacent to this inter-magnetic-pole portion, which is detected by the magnetic sensor, gradually changes sinusoidally. On the other hand, the magnetic sensor changes a value of an output signal thereof to "1" or "0" depending on whether it is subject to inflow of the magnetic field of an N-pole or inflow of the magnetic field of an S-pole. More specifically, the magnetic sensor changes the value of the output signal from "1" to "0" at a point when the magnetic pole of the sensor magnet changes from an N-pole to an S-pole, and changes the value of the output signal from "0" to "1" at a point when the magnetic pole of the sensor magnet changes from an S-pole to an N-pole.

However, because a magnetic field detection sensitivity of the magnetic sensor has variation due to manufacturing error thereof, disadvantage has been caused in that the circumferential position of a magnetic pole detected by each magnetic sensor deviates in comparison between a magnetic sensor having low detection sensitivity of magnetic field and a magnetic sensor having high detection sensitivity of magnetic field. In particular, there has been disadvantage in that a magnetic sensor having low detection sensitivity of magnetic field provides low accuracy of detection of a magnetic pole position, so that a motor quality is deteriorated.

SUMMARY

The present invention has been made in view of the foregoing circumstances, and an object of the present invention is to provide a permanent-magnet synchronous motor that can contribute to improvement of quality.

In order to solve the above-mentioned problems and achieve the object, the present invention provides a permanent-magnet synchronous motor comprising: an annular stator core; a cylindrical rotor disposed on an inner side of the stator core so as to be coaxial with the stator core and having a first end face and a second end face; a disk-shaped sensor magnet having a plurality of magnetic poles disposed circumferentially and having a third end face and a fourth end face; and a magnetic sensor disposed so as to face the fourth end face and detecting a rotating position of the disk-shaped sensor magnet, wherein the third end face faces the first end face, and when a thickness of each of the magnetic poles in the axial direction is a first thickness and a thickness of an inter-magnetic-pole portion, which is located between adjacent magnetic poles among the plurality of magnetic poles, in the axial direction is a second thickness, the second thickness is larger than the first thickness.

The permanent-magnet synchronous motor according to the present invention is advantageous in having improved quality.

DETAILED DESCRIPTION

The permanent-magnet synchronous motors, methods for manufacturing a permanent-magnet synchronous motor, and the air conditioners according to the embodiments of the present invention will be described below in detail with reference to the drawings. Note that these embodiments are not intended to limit the scope of the present invention.

First Embodiment

Figure 1:
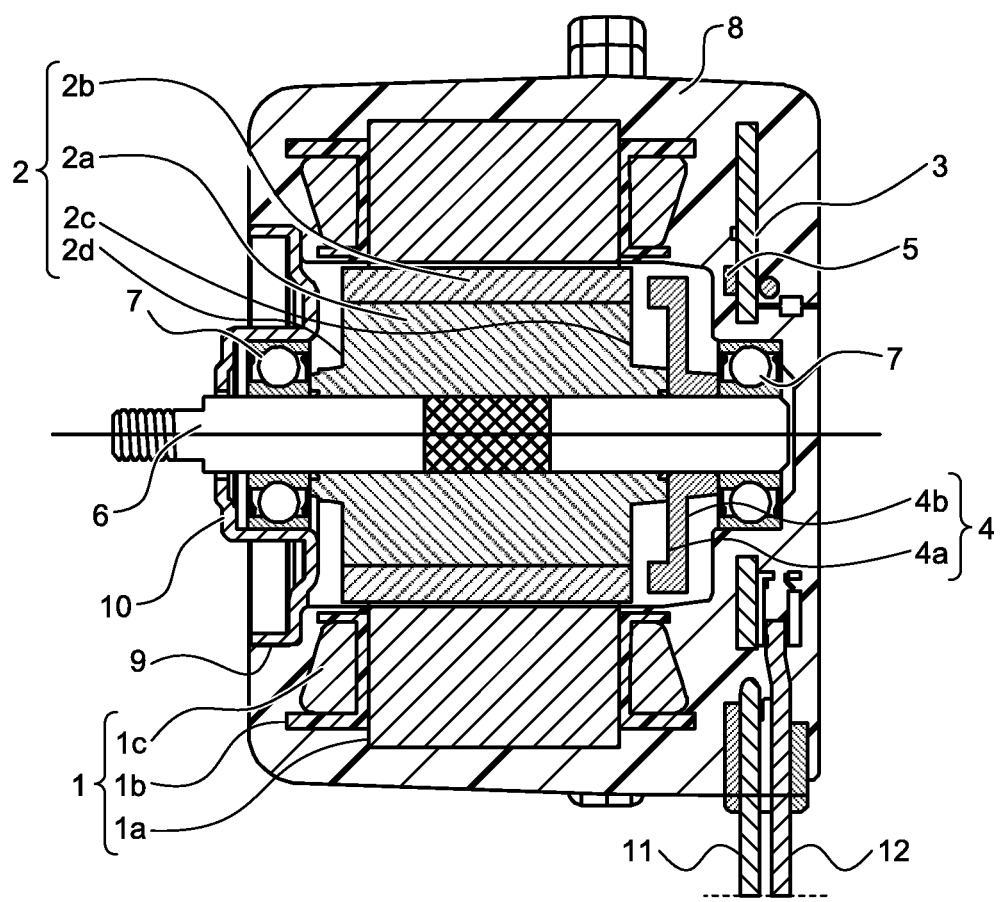
FIG. 1 is a cross-sectional view of a permanent-magnet synchronous motor according to a first embodiment of the present invention.

FIG. 1 is a cross-sectional view of a permanent-magnet synchronous motor according to a first embodiment of the present invention. The permanent-magnet synchronous motor is hereinafter referred to simply as motor 100. The motor 100 includes: an annular stator 1; a cylindrical rotor 2 disposed inside the stator 1; a substrate 3 disposed on one end side of the stator 1 in an the axial direction of the stator 1; a disk-shaped sensor magnet 4 that is disposed between the rotor 2 and the substrate 3 and rotates together with the rotor 2; and a magnetic sensor 5 that is disposed on the substrate 3 to face an end face of the sensor magnet 4 and detects a rotational position of the sensor magnet 4.

The motor 100 also includes: a rotary shaft 6 penetrating through a center portion of the rotor 2; a pair of bearings 7 that rotatably support the rotary shaft 6; a mold resin shell 8 formed of a thermosetting resin material, which forms an outer shell of the motor 100 and also forms a housing surrounding an outer ring of the bearing 7 farther from a load, disposed on one end side of the stator 1; and a bracket 10 fitted on an inner circumferential surface of an opening 9 formed in the mold resin shell 8, which surrounds an outer ring of the bearing 7 nearer to the load, disposed on the other end side of the stator 1. As used herein, the phrase "nearer to the load" means the left on the paper, while the phrase "farther from a load" means the right on the paper.

The stator 1 is composed of an annular stator core 1a that is constructed of multiple iron core pieces stacked on top of another, the pieces being punched out from an electromagnetic steel sheet base material having a thickness of from 0.2 mm to 0.5 mm; an insulator 1b that is formed by monolithic molding with the stator core 1a or made separately from the stator core 1a, and then fitted into the stator core 1a; and a coil 1c formed by winding magnet wires around teeth (not illustrated) formed in the stator core 1a.

The insulator 1b is formed from an insulating resin such as polybutylene terephthalate (PBT), poly phenylene sulfide (PPS), liquid crystal polymer (LCP), or polyethylene terephthalate (PET), or paper.

The rotor 2 includes: an annular back yoke 2a through which the rotary shaft 6 penetrates in a center portion thereof, the annular back yoke 2a being constructed of multiple iron core pieces stacked on top of another, the pieces being punched out from an electromagnetic steel sheet base material having a thickness of from 0.2 mm to 0.5 mm; and a main magnet 2b that is provided on an outer circumferential surface of the back yoke 2a, has multiple magnetic poles having circumferentially alternating polarity, and has a pair of end faces opposed to each other in an axial direction. The material for forming the main magnet 2b is any one of a rare earth magnet material mainly containing neodymium, iron, and boron, a rare earth magnet material mainly containing samarium, iron, and nitrogen, and a ferrite magnet. Note that the material for forming the back yoke 2a is not limited to an electromagnetic steel sheet, but a cylindrical resin iron core or ferrite bonded magnet may also be used for the back yoke 2a. A rotor 2 formed of electromagnetic steel sheets can improve the yield of the punching process of an electromagnetic steel sheet by using one and the same electromagnetic steel sheet for the stator core. The rotor 2 formed of electromagnetic steel sheets has superior soft-magnetic properties to a rotor 2 formed of a resin iron core. A rotor 2 formed of a resin iron core can be formed integrally with the main magnet, and thus the main magnet and the back yoke has no gap therebetween, thereby allowing the magnetic flux in the rotor to be increased. A rotor 2 formed of a ferrite bonded magnet can be formed integrally with the main magnet, and thus the main magnet and the back yoke has no gap therebetween, thereby allowing the magnetic flux in the rotor to be increased. The rotor 2 formed of a ferrite bonded magnet can have a longer magnetic path than the rotor 2 formed of electromagnetic steel sheets or a resin iron core, thereby allowing a permeance coefficient to be increased, and the magnetic flux to be increased.

The back yoke 2a has an axial length equal to the axial length of the main magnet 2b. One end face of the back yoke 2a in an axial direction and one end face of the main magnet 2b in an axial direction form a first end face 2c of two end faces of the rotor 2. The other end face of the back yoke 2a in the axial direction and the other end face of the main magnet 2b in the axial direction form a second end face 2d of the two end faces of the rotor 2. That is, the cylindrical rotor 2 composed of the back yoke 2a and the main magnet 2b has the first end face 2c in the axial direction of the stator core 1a, and the second end face 2d in the axial direction of the stator core 1a.

The multiple magnetic poles of the main magnet 2b are magnetized as an S-pole and an N-pole in the radial direction, and S-poles and N-poles are arranged to circumferentially alternate with one another on the radially outer side of the main magnet 2b.

The sensor magnet 4 includes multiple magnetic poles arranged circumferentially, and has a third end face 4a opposed to the first end face 2c, and a fourth end face 4b in the axial direction of the stator core 1a. As described above, the multiple magnetic poles of the main magnet 2b are magnetized as an S-pole and an N-pole along the radial direction, and S-poles and N-poles are arranged to circumferentially alternate with one another on the radially outer side of the main magnet 2b.

In contrast, the multiple magnetic poles of the sensor magnet 4 are magnetized as an S-pole and an N-pole in the axial direction so that their respective magnetic fields flow into the magnetic sensor 5, and the S-poles and the N-poles are arranged to circumferentially alternate with one another. As described above, the magnetic orientation of each of the multiple magnetic poles of the sensor magnet 4 differs from the magnetic orientation of each of the multiple magnetic poles of the main magnet 2b, but the sensor magnet 4 has the same number of magnetic poles as the number of magnetic poles of the main magnet 2b, and the circumferential positions of the multiple magnetic poles of the sensor magnet 4 are respectively aligned with the circumferential positions of the multiple magnetic poles of the main magnet 2b.

The magnetic sensor 5 detects a magnetic field from a magnetic pole of the sensor magnet 4, and changes a value of an output signal thereof to "1" or "0" depending on whether it is subjected to inflow of the magnetic field of an N-pole or inflow of the magnetic field of an S-pole. More specifically, the magnetic sensor 5 changes the value of the output signal from "1" to "0" at a point when the magnetic pole of the sensor magnet 4 changes from N-pole to S-pole, and changes the value of the output signal from "0" to "1" at a point when the magnetic pole of the sensor magnet 4 changes from S-pole to N-pole.

The substrate 3 is connected with a power supply lead wire 11 for supplying power to the coil 1c, and with a sensor lead wire 12, in addition to the magnetic sensor 5.

After the substrate 3 is incorporated into the stator 1, mold forming is performed using a material for the mold resin shell 8 to get a molded stator. The rotor 2 having mounted thereon the bearing 7 farther from the load is inserted into the molded stator, and then the other bearing 7 and the bracket 10 are incorporated in a load side of the rotor 2 to obtain the motor 100. Rotation of the motor 100 having this configuration causes the magnetic field inputted from the sensor magnet 4 to the magnetic sensor 5 to vary, so that the output signal of the magnetic sensor 5 changes from "1" to "0" or from "0" to "1."

The output signal of the magnetic sensor 5 is read by a control circuit provided inside the motor 100, or read by a control circuit provided outside the motor 100. This operation enables the control circuit to indirectly detect the magnetic pole position of the main magnet 2b. The control circuit then realizes a process such that a current that is optimized according to the magnetic pole position of the main magnet 2b flows in the coil 1c. Note that a current to flow in the coli 1c, which is not optimized for the magnetic pole position of the main magnet 2b, results in a decrease in motor efficiency or an increase of noise. For this reason, position detection is required to have high accuracy.

However, the detection sensitivity of magnetic field varies due to individual difference of the magnetic sensor 5. For that reason, inaccuracy is caused in the circumferential position of the magnetic pole detected by the magnetic sensor 5 in comparison between a magnetic sensor 5 having low detection sensitivity of magnetic field and a magnetic sensor 5 having high detection sensitivity of magnetic field. In particular, use of a magnetic sensor 5 having low detection sensitivity of magnetic field results in failure to optimize the phase of the current that is caused to flow through the coil 1c. This may reduce the quality of the motor.

In the motor 100 of the first embodiment, of thicknesses in the axial direction of the sensor magnet 4, a thickness of an inter-magnetic-pole portion between adjacent magnetic poles of the multiple magnetic poles is greater than a thickness at a magnetic pole center of each of the multiple magnetic poles. This configuration relatively increases the magnetic field generated from the inter-magnetic-pole portion, thereby causing a rapid change in the magnetic field from the magnetic pole center to the inter-magnetic-pole portion. Therefore, even use of a magnetic sensor 5 having low detection sensitivity of magnetic field can improve the accuracy of position detection.

The configuration of the sensor magnet 4 will be described below in detail with reference to FIGS. 2 to 5.

Figure 2:
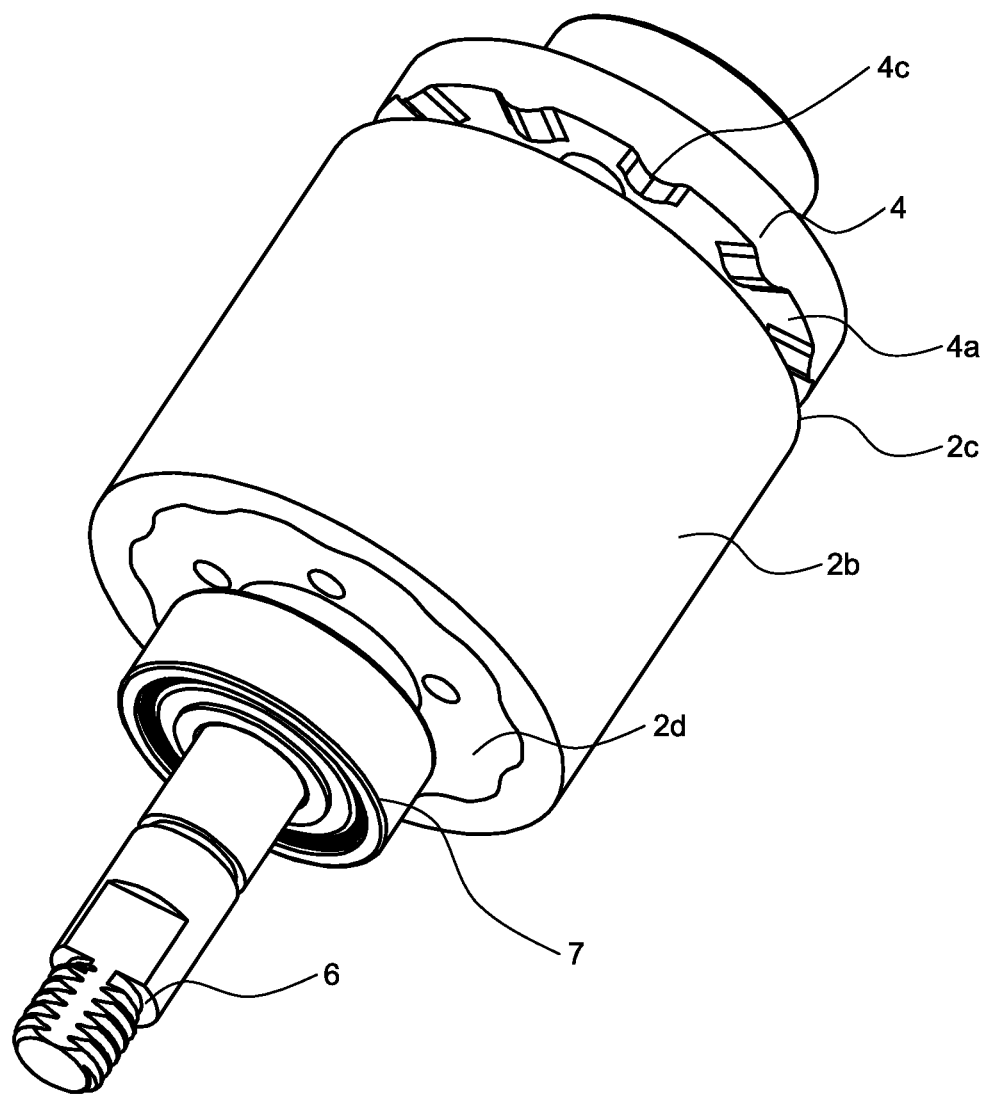
FIG. 2 is a perspective view of a rotor and a sensor magnet of the permanent-magnet synchronous motor according to the first embodiment.

FIG. 2 is a perspective view of the rotor and the sensor magnet of the permanent-magnet synchronous motor according to the first embodiment. As illustrated in FIG. 2, the sensor magnet 4 has protrusions 4c in the inter-magnetic-pole portions on the third end face 4a. The multiple protrusions 4c are each formed by configuring the axial thickness of the sensor magnet 4 such that a thickness of an inter-magnetic-pole portion between adjacent magnetic poles of the multiple magnetic poles is greater than a thickness at a magnetic pole center of each of the multiple magnetic poles.

Figure 3:
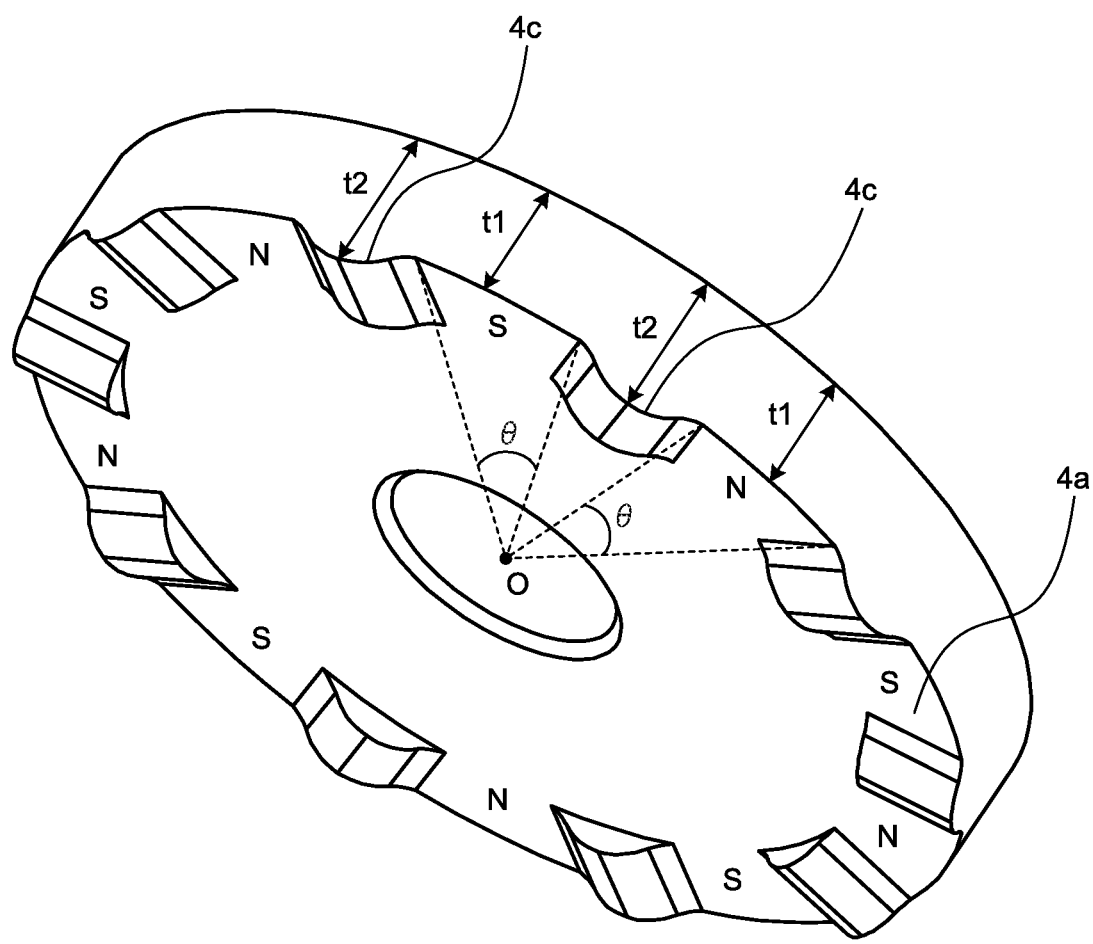
FIG. 3 is an enlarged view of the sensor magnet illustrated in FIG. 2.

FIG. 3 is an enlarged view of the sensor magnet illustrated in FIG. 2. The sensor magnet 4 is configured to have its thicknesses in the axial direction of the magnet 4 such that a thickness at the magnetic pole center of each of the multiple magnetic poles is a first thickness t1 and a thickness of the inter-magnetic-pole portion between adjacent magnetic poles of the multiple magnetic poles is a second thickness t2, the second thickness t2 being greater than the first thickness t1. For simplicity of description, the first thickness t1 is sometimes referred to simply as t1, and the second thickness is sometimes referred to simply as t2. When θ represents an angle of a range in which a thickness at the center of each of the multiple magnetic poles in the axial direction is t1, where a center of the sensor magnet 4 in a radial direction is centered, and N represents the number of magnetic poles of the sensor magnet 4, the angle θ has a value satisfying θ<230/N [deg].

A description will next be made about the reason for using a shape formed such that the thickness of the inter-magnetic-pole portion and the thickness at the magnetic pole center of the sensor magnet 4 satisfy a relationship of t2>t1.

Figure 4:
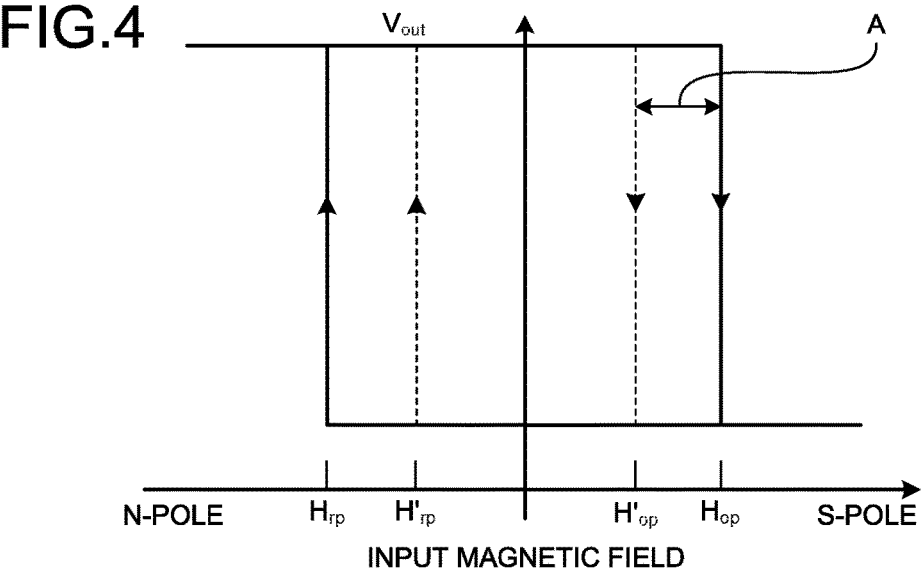
FIG. 4 is a graph illustrating a relationship between an input magnetic field inputted to each of two magnetic sensors having different detection sensitivities of magnetic field, and an output signal of each of these magnetic sensors.

FIG. 4 is a graph illustrating a relationship between an input magnetic field inputted to each of two magnetic sensors having different detection sensitivities of magnetic field, and an output signal of each of these magnetic sensors. As used herein, of the two magnetic sensors 5 having different detection sensitivities of magnetic field, the magnetic sensor 5 having a higher detection sensitivity of magnetic field is referred to as a first magnetic sensor, and the magnetic sensor 5 having a lower detection sensitivity of magnetic field than the first magnetic sensor is referred to as a second magnetic sensor. The vertical axis indicates a value of an output signal $V_{out}$ of each of the first magnetic sensor and the second magnetic sensor. The horizontal axis indicates the strength of the input magnetic field inputted to each of the first magnetic sensor and the second magnetic sensor. The right part of the horizontal axis indicates the magnetic field generated by an S-pole of the sensor magnet 4, while the left part of the horizontal axis indicates the magnetic field generated by an N-pole of the sensor magnet 4.

The reference character $H'_{op}$ represents a magnetic field having a value that allows detection of change of a magnetic pole of the sensor magnet 4 from N-pole to S-pole, of the magnetic fields inputted to the first magnetic sensor having the higher detection sensitivity of magnetic field. The reference character $H_{op}$ represents a magnetic field having a value that allows detection of change of a magnetic pole of the sensor magnet 4 from N-pole to S-pole, of the magnetic fields inputted to the second magnetic sensor having the lower detection sensitivity of magnetic field. The reference character $H'_{rp}$ represents a magnetic field having a value that allows detection of change of a magnetic pole of the sensor magnet 4 from S-pole to N-pole, of the magnetic fields inputted to the first magnetic sensor. The reference character $H_{rp}$ represents a magnetic field having a value that allows detection of change of a magnetic pole of the sensor magnet 4 from S-pole to N-pole, of the magnetic fields inputted to the second magnetic sensor.

The individual difference between the first magnetic sensor and the second magnetic sensor causes a difference in detection sensitivity of magnetic field as shown by a reference character A. Upon detection of a magnetic field of an S-pole corresponding to the value represented by $H'_{op}$, the first magnetic sensor determines that the magnetic pole of the sensor magnet 4 has changed from N-pole to S-pole, and accordingly changes the value of the output signal $V_{out}$ from "1" to "0." On the other hand, upon detection of a magnetic field of an N-pole corresponding to the value represented by $H'_{rp}$, the first magnetic sensor determines that the magnetic pole of the sensor magnet 4 has changed from S-pole to N-pole, and accordingly changes the value of the output signal $V_{out}$ from "0" to "1."

In contrast, upon detection of a magnetic field of an S-pole corresponding to the value represented by $H_{out}$ that is a higher value than $H'_{op}$, the second magnetic sensor having the lower detection sensitivity of magnetic field determines that the magnetic pole of the sensor magnet 4 has changed from N-pole to S-pole, and thus changes the value of the output signal $V_{out}$ from "1" to "0." On the other hand, upon detection of a magnetic field of an N-pole corresponding to the value represented by $H_{rp}$ that is a higher value than $H'_{rp}$, the second magnetic sensor determines that the magnetic pole of the sensor magnet 4 has changed from S-pole to N-pole, and thus changes the value of the output signal $V_{out}$ from "0" to "1."

As described above, a difference in detection sensitivity of magnetic field causes the circumferential positions of a magnetic pole respectively detected by the first magnetic sensor and the second magnetic sensor to differ. In particular, since the second magnetic sensor has low accuracy of detection of a magnetic pole position, a motor using the second magnetic sensor results in quality degradation. Since variation in the detection sensitivity of magnetic field of the magnetic sensor 5 is caused by a manufacturing error, it is important to manufacture a motor 100 that can make accuracy of position detection improved while dependence on the detection sensitivity of the magnetic sensor 5 is lowered.

Figure 5:
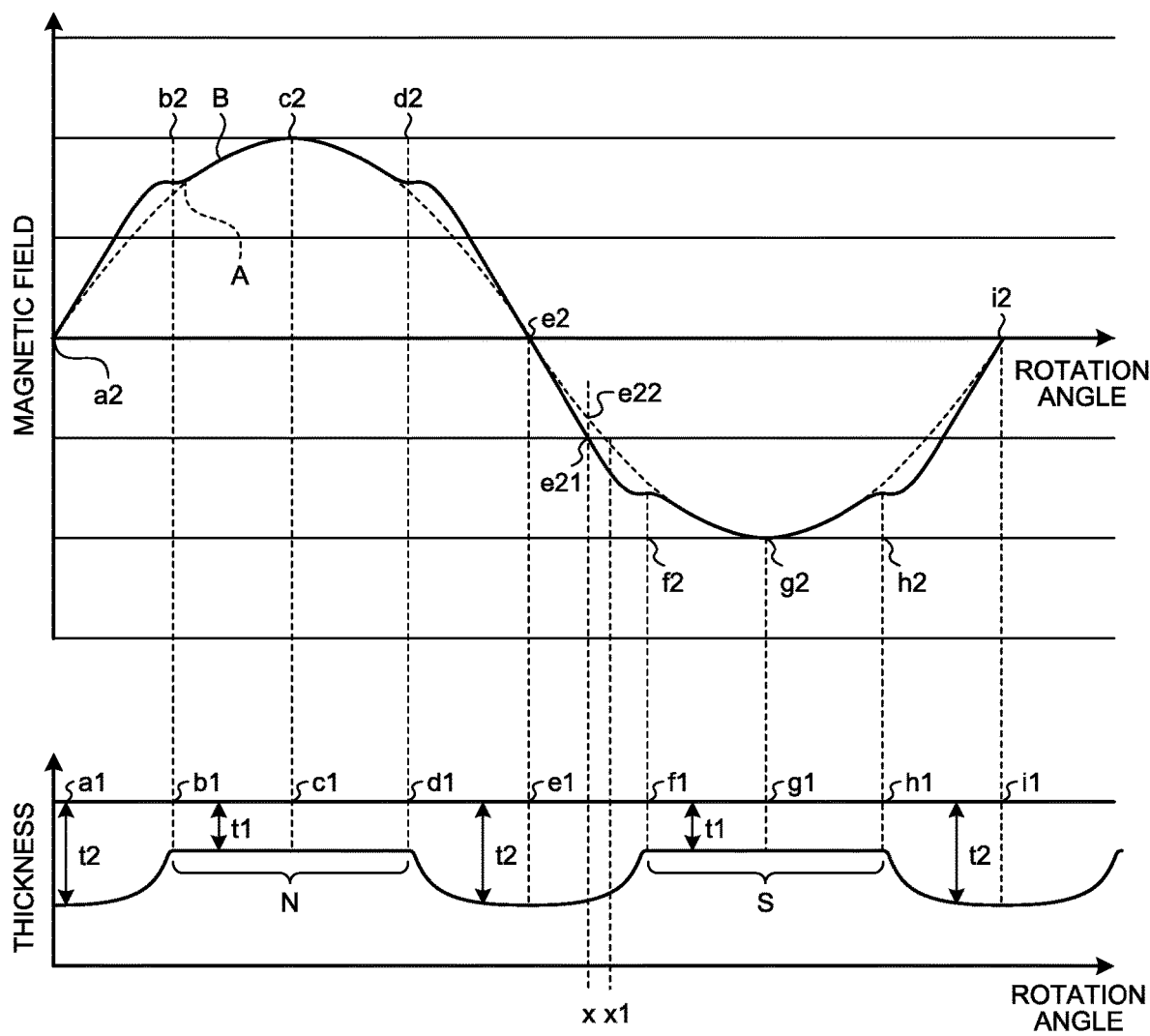
FIG. 5 is a graph illustrating a relationship between a change in a surface magnetic field and a rotation angle of the sensor magnet.

FIG. 5 is a graph illustrating a relationship between a change in a surface magnetic field and a rotation angle of the sensor magnet. The upper part of FIG. 5 illustrates a change in the surface magnetic field of the sensor magnet 4. The horizontal axis indicates the rotation angle of the sensor magnet 4, and the vertical axis indicates the strength of the surface magnetic field of the sensor magnet 4. The lower part of FIG. 5 schematically illustrates a cross-sectional shape of the sensor magnet 4 of the first embodiment. The horizontal axis indicates the rotation angle of the sensor magnet 4, and the vertical axis indicates the thickness of the sensor magnet 4.

A point a1 in the graph marks the center of an inter-magnetic-pole portion between an S-pole not illustrated on the left side of the paper and the N-pole. A point b1 marks a boundary portion between the center a1 of the inter-magnetic-pole portion and the magnetic pole center c1 of the N-pole. A point d1 marks a boundary portion between the magnetic pole center c1 and the center e1 of the inter-magnetic-pole portion between the N-pole and the S-pole. A point f1 marks a boundary portion between the inter-magnetic-pole portion center e1 and the magnetic pole center g1 of the S-pole. A point h1 marks a boundary portion between the magnetic pole center g1 and the center i1 of an inter-magnetic-pole portion. The center i1 of an inter-magnetic-pole portion is a center of the inter-magnetic-pole portion between the S-pole and an N-pole not illustrated on the right side of the paper.

The magnetic field A by a dotted line represents the surface magnetic field of a conventional sensor magnet. It is assumed herein that the conventional sensor magnet has the number of magnetic poles equal to the number of magnet poles of the sensor magnet of the first embodiment, and that the circumferential positions of the magnetic pole centers and the circumferential positions of the magnetic pole center portions correspond to the circumferential positions of the magnetic pole centers and the circumferential positions of the magnetic pole center portions of the sensor magnet 4 of the first embodiment. The positive part of the magnetic field A is the magnetic field of an N-pole of the conventional sensor magnet, and the negative part of the magnetic field A is the magnetic field of an S-pole of the conventional sensor magnet. The magnetic sensor incorporated in a motor that uses a conventional sensor magnet detects the magnetic field A having a sinusoidal waveform that gradually increases to a peak and then gradually decreases as time advances.

The magnetic field B by a solid line represents the surface magnetic field of the sensor magnet 4 of the first embodiment. The positive part of the magnetic field B represents the magnetic field of an N-pole of the sensor magnet 4 of the first embodiment, and the negative part of the magnetic field B represents the magnetic field of an S-pole of the sensor magnet 4. The magnetic sensor 5 incorporated in the motor 100 of the first embodiment detects the magnetic field B having a rectangular or trapezoidal waveform different from the waveform of the magnetic field A. More specifically, when a1 is opposed to the magnetic sensor 5, the magnetic sensor 5 detects the magnetic field B having a value indicated by a2.

Similarly, when the boundary portion b1, the magnetic pole center c1, the boundary portion d1, the inter-magnetic-pole portion center e1, the boundary portion f1, the magnetic pole center g1, the boundary portion h1, and the inter-magnetic-pole portion center i1 are opposed to the magnetic sensor 5, the magnetic sensor 5 detects the magnetic fields B having values indicated by b2, c2, d2, e2, f2, g2, h2, and i2, respectively.

In comparison between the magnetic field B and the magnetic field A, for example, a value of the magnetic field B in a positional range of a rotation angle from the point a1 to the point c1 exhibits a positively larger value than a value of the magnetic field A, and a difference between the magnetic field B and the magnetic field A tends to increase until the point b1, while a difference between the magnetic field B and the magnetic field A tends to decrease from the point b1 to the point c1. In addition, a value of the magnetic field B in a positional range of a rotation angle from the point c1 to the point e1 exhibits a positively larger value than a value of the magnetic field A, and a difference between the magnetic field B and the magnetic field A tends to increase until the point d1, while a difference between the magnetic field B and the magnetic field A tends to decrease from the point d1 to the point e1.

A value of the magnetic field B in a positional range of a rotation angle from the point e1 to the point g1 exhibits a negatively larger value than a value of the magnetic field A, and a difference between the magnetic field B and the magnetic field A tends to increase until the point f1, while a difference between the magnetic field B and the magnetic field A tends to decrease from the point f1 to the point g1. A value of the magnetic field B in a positional range of a rotation angle from the point g1 to the point i1 exhibits a negatively larger value than a value of the magnetic field A, and a difference between the magnetic field B and the magnetic field A tends to increase until the point h1, while the difference in the strength between the magnetic field B and the magnetic field A tends to decrease from the point h1 to the point i1.

Here, a value of the magnetic field A at a rotation angle x in any position between the point e1 and the point f1 is expressed by e22, and a value of the magnetic field B at the rotation angle x is expressed by e21. In addition, a rotation angle at which the magnetic field A equivalent to that of e21 is generated is expressed by x1. Moreover, this example is based on the assumption that the second magnetic sensor having the lower detection sensitivity of magnetic field can detect a magnetic field of e21, but cannot detect a magnetic field of e22. Under this condition, the second magnetic sensor can detect a change of the magnetic pole of the conventional sensor magnet from N-pole to S-pole only when that sensor magnet has rotated to the point corresponding to the rotation angle x1.

The sensor magnet 4 of the first embodiment is formed such that the thickness t2 of the inter-magnetic-pole portion is greater than the thickness t1 at the magnetic pole center. Therefore, the sensor magnet 4 can increase the strength of the magnetic field generated from the inter-magnetic-pole portions as compared to the conventional sensor magnet having an axial thickness that is constant in the circumferential direction. The magnetic sensor 5 detects the magnetic field generated from an inter-magnetic-pole portion, thereby making it possible to determine the magnetic pole position of the sensor magnet 4, that is, the magnetic pole position of the main magnet 2b. Therefore, the use of the sensor magnet 4 having the relationship of t2>t1 can improve the accuracy of detection of the magnetic pole position.

Note that in a general sense, the axial thickness of the sensor magnet 4 is entirely increased in order to improve an accuracy of position detection of the rotor 2. However, since the position detection process uses the magnetic field of the inter-magnetic-pole portion, the sensor magnet 4 of the first embodiment is configured such that only the thickness of the inter-magnetic-pole portions is increased. This configuration can reduce the amount of material used for the production of the sensor magnet 4 as compared to the case of increasing the axial thickness of the sensor magnet 4 entirely, thereby enabling the sensor magnet 4 to be produced at low cost.

Figure 6:
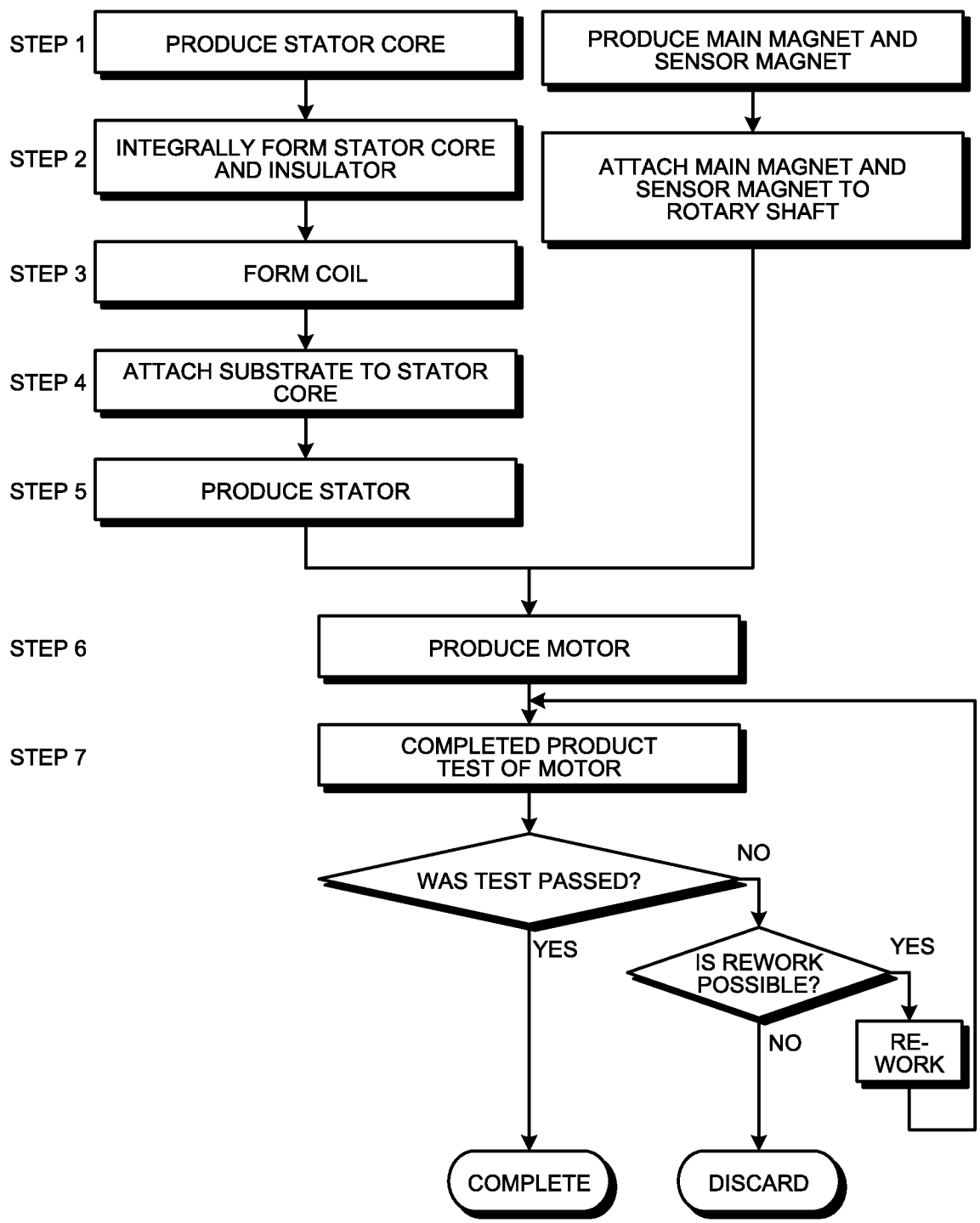
FIG. 6 is a chart illustrating a manufacturing process of the permanent-magnet synchronous motor according to the first embodiment of the present invention.

The manufacturing process of the motor 100 will next be described. FIG. 6 is a chart illustrating a manufacturing process of the permanent-magnet synchronous motor according to the first embodiment of the present invention.

(1) Step 1: Multiple iron core pieces are stacked on top of another to produce the stator core 1a. Additionally, the main magnet 2b of the rotor 2 and the sensor magnet 4 are produced.

(2) Step 2: The stator core 1a and the insulator 1b are formed integrally. In addition, the main magnet 2b and the sensor magnet 4 are attached to the rotary shaft 6 in such a manner that the third end face 4a is opposed to the first end face 2c.

(3) Step 3: Magnet wires are wound in multiple slots formed in the stator 1 to form the coil 1c. In addition, the bearing 7 nearer to the load and the bearing 7 farther from the load are press-fit on the rotary shaft 6 to produce the rotor 2.

(4) Step 4: The substrate 3 is attached to the stator core 1a having the coil 1c formed thereon.

(5) Step 5: The stator core 1a and the substrate 3 are encapsulated by mold forming to produce the stator 1.

(6) Step 6: The rotor 2 is installed inside the stator 1, and the opening 9 of the stator 1 is closed by the bracket 10 to produce the motor 100.

(7) Step 7: A completed product test is performed on the motor 100. A motor 100 having passed the completed product test will be shipped as its completed product. A motor 100 having failed the completed product test will be reworked if rework is possible, and the product test will be performed again after the reworking, but if rework is not possible, the motor 100 will be discarded.

As described above, the motor 100 of the first embodiment uses the sensor magnet 4, and can thus improve the accuracy of position detection of the rotor 2 while dependence of the accuracy of position detection on the sensitivity of the magnetic sensor 5 is lowered. An improvement in the accuracy of position detection of the rotor 2 can increase the motor efficiency, and can prevent an increase of motor noise.

Second Embodiment

Figure 7:
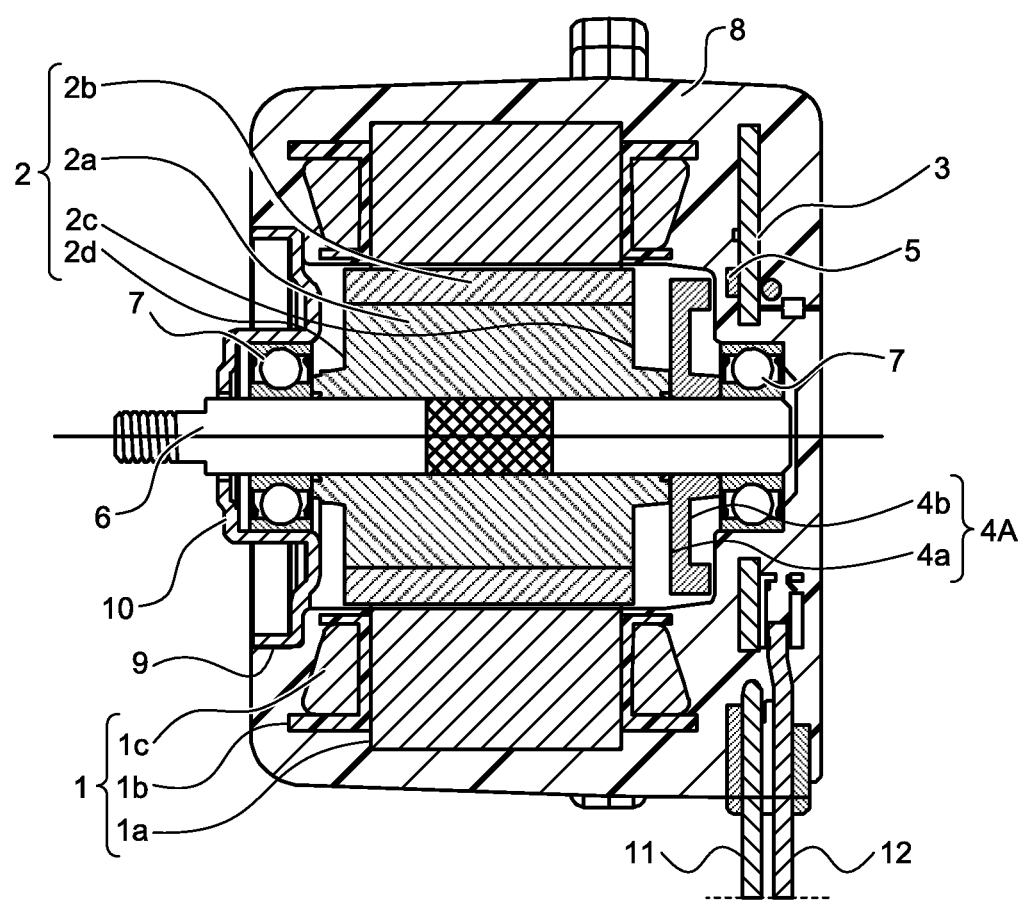
FIG. 7 is a cross-sectional view of the permanent-magnet synchronous motor according to a second embodiment of the present invention.

FIG. 7 is a cross-sectional view of the permanent-magnet synchronous motor according to a second embodiment of the present invention. The motor 100 of the second embodiment uses a sensor magnet 4A in place of the sensor magnet 4 of the first embodiment.

Figure 8:
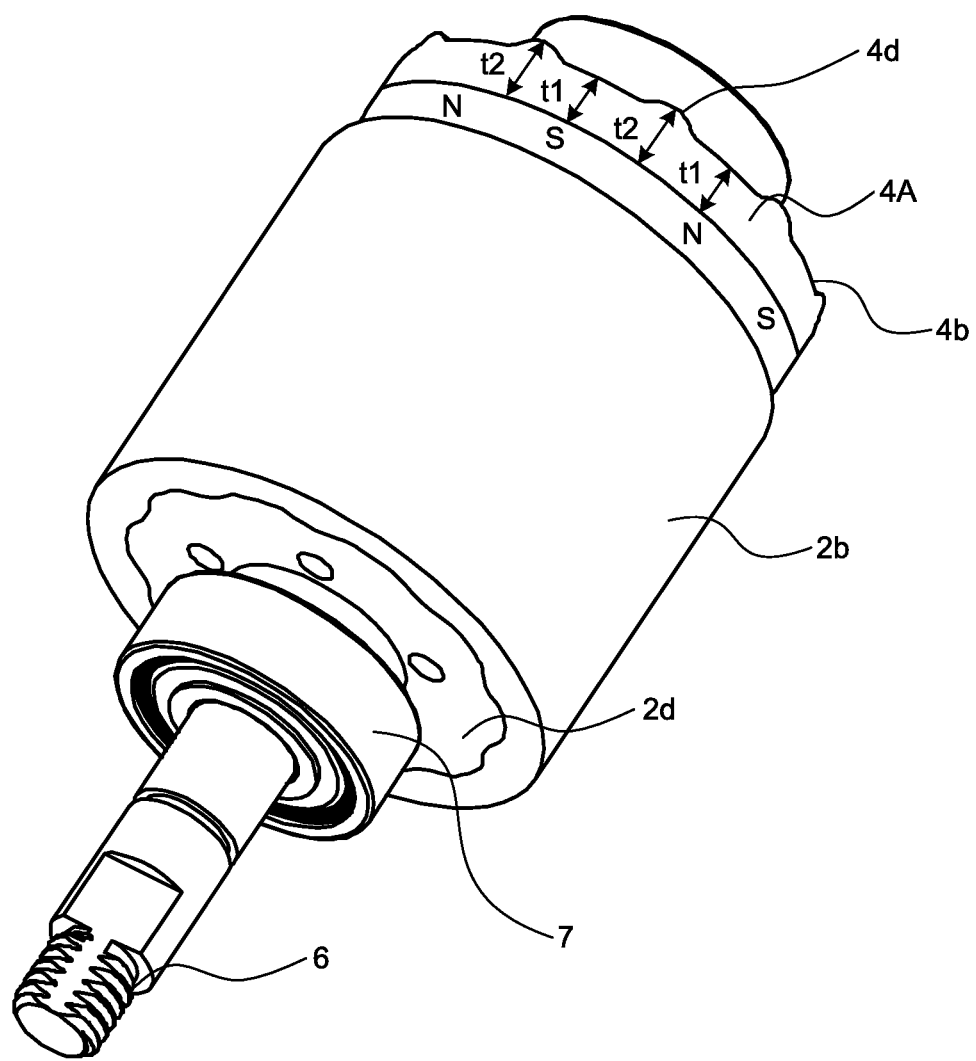
FIG. 8 is a perspective view of the rotor and the sensor magnet of the permanent-magnet synchronous motor according to the second embodiment.

FIG. 8 is a perspective view of the rotor and the sensor magnet of the permanent-magnet synchronous motor according to the second embodiment. The sensor magnet 4 of the first embodiment includes the multiple protrusions 4c formed on the third end face 4a as illustrated in FIG. 2. In contrast, as illustrated in FIG. 8, the sensor magnet 4A of the second embodiment includes protrusions 4d on the fourth end face 4b in the inter-magnetic-pole portions.

The multiple protrusions 4d are formed by configuring a thickness of the sensor magnet 4 in the axial direction such that a thickness of the inter-magnetic-pole portion between adjacent magnetic poles of the multiple magnetic poles is greater than a thickness at the magnetic pole center of each of the multiple magnetic poles. For thicknesses of the sensor magnets 4A in the axial direction thereof, when t1 represents a thickness at the magnetic pole center of each of the multiple magnetic poles and t2 represents a thickness of the inter-magnetic-pole portion between adjacent magnetic poles of the multiple magnetic poles, the sensor magnet 4A is formed such that the thickness t2 is greater than the thickness t1.

In addition, when an angle of a range in which the axial thickness at the center of each of the multiple magnetic poles is t1 is expressed by θ, where a center of the sensor magnet 4A in the radial direction of the magnet is centered, and the number of magnetic poles of the sensor magnet 4A is expressed by N, the angle θ has a value satisfying θ<230/N [deg]. Even this configuration can offer an advantage similar to that of the sensor magnet 4 of the first embodiment.

Third Embodiment

Figure 9:
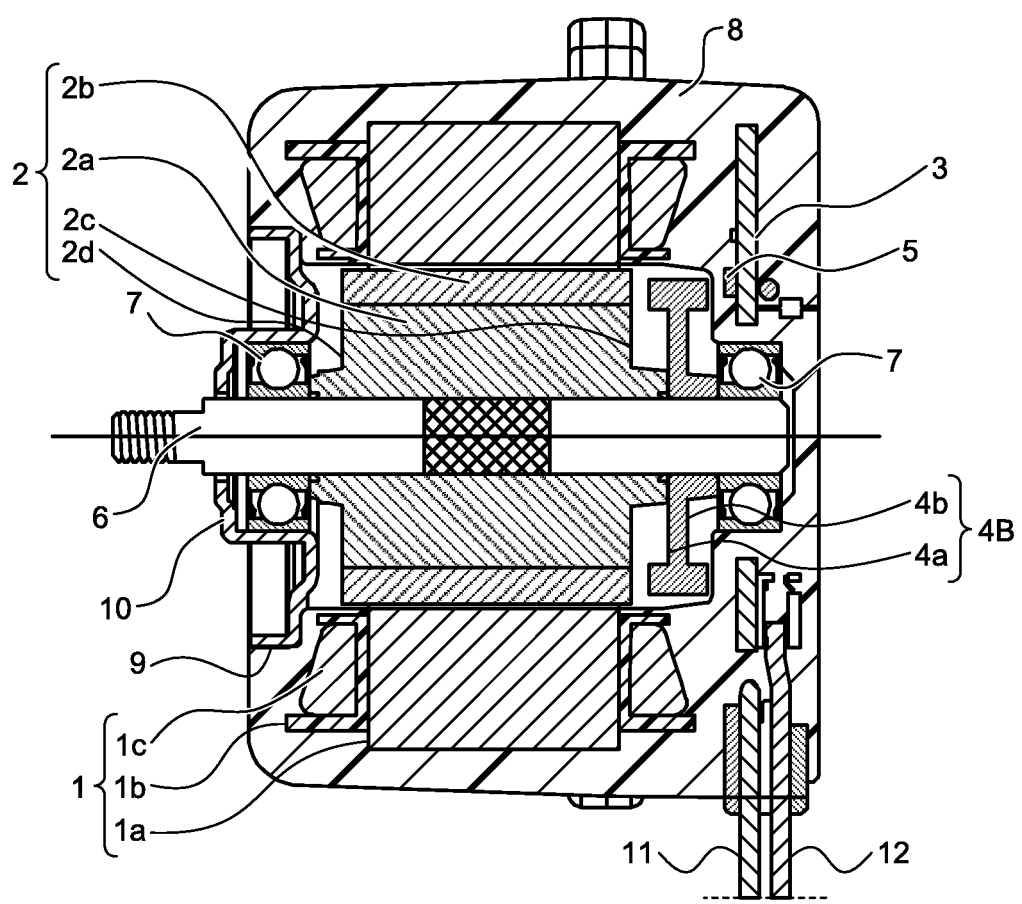
FIG. 9 is a cross-sectional view of the permanent-magnet synchronous motor according to a third embodiment of the present invention.

FIG. 9 is a cross-sectional view of the permanent-magnet synchronous motor according to a third embodiment of the present invention. The motor 100 of the third embodiment uses a sensor magnet 4B in place of the sensor magnet 4 of the first embodiment.

Figure 10:
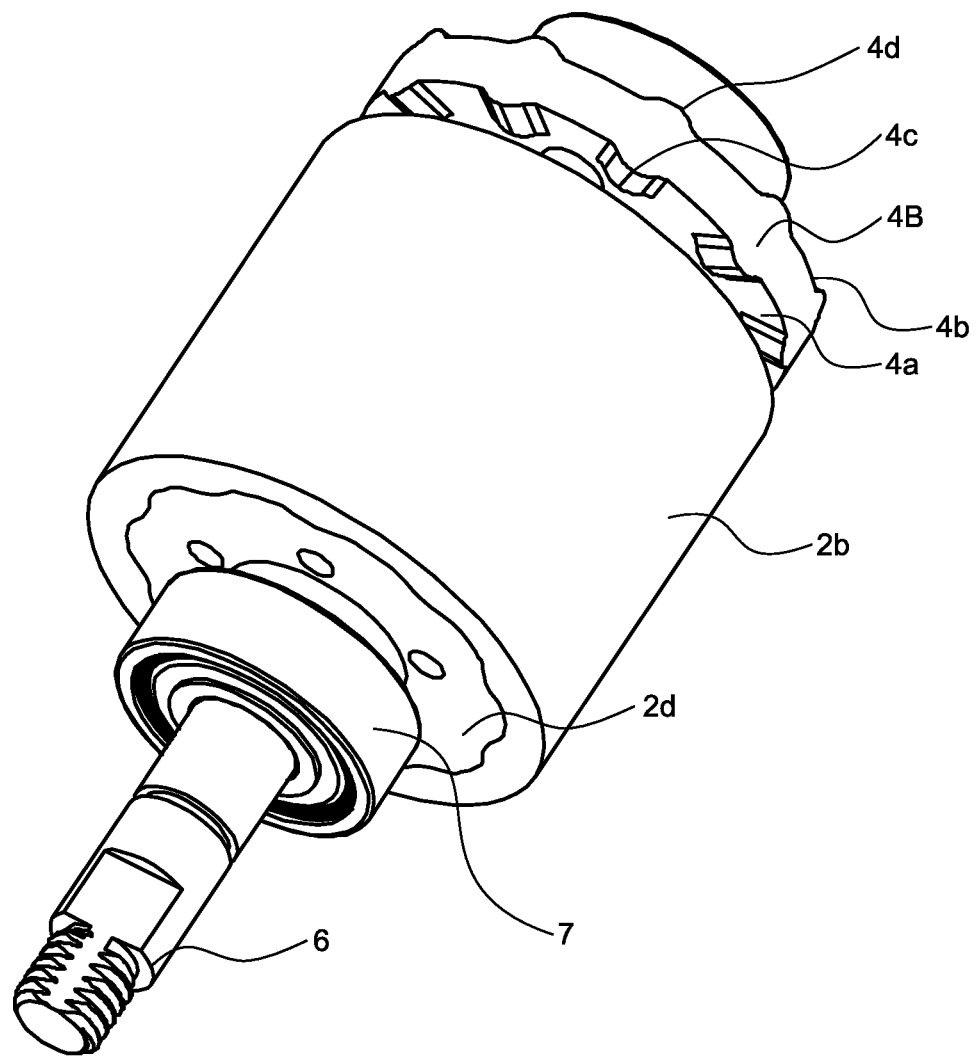
FIG. 10 is a perspective view of the rotor and the sensor magnet of the permanent-magnet synchronous motor according to the third embodiment.

FIG. 10 is a perspective view of the rotor and the sensor magnet of the permanent-magnet synchronous motor according to the third embodiment. The sensor magnet 4B of the third embodiment includes the protrusions 4c on the third end face 4a in the inter-magnetic-pole portions, and includes the protrusions 4d on the fourth end face 4b in the inter-magnetic-pole portions. The multiple protrusions 4c and 4d are formed by configuring a thickness of the sensor magnet 4B in the axial direction such that a thickness of the inter-magnetic-pole portion between adjacent magnetic poles of the multiple magnetic poles is greater than a thickness at the magnetic pole center of each of the multiple magnetic poles.

Figure 11:
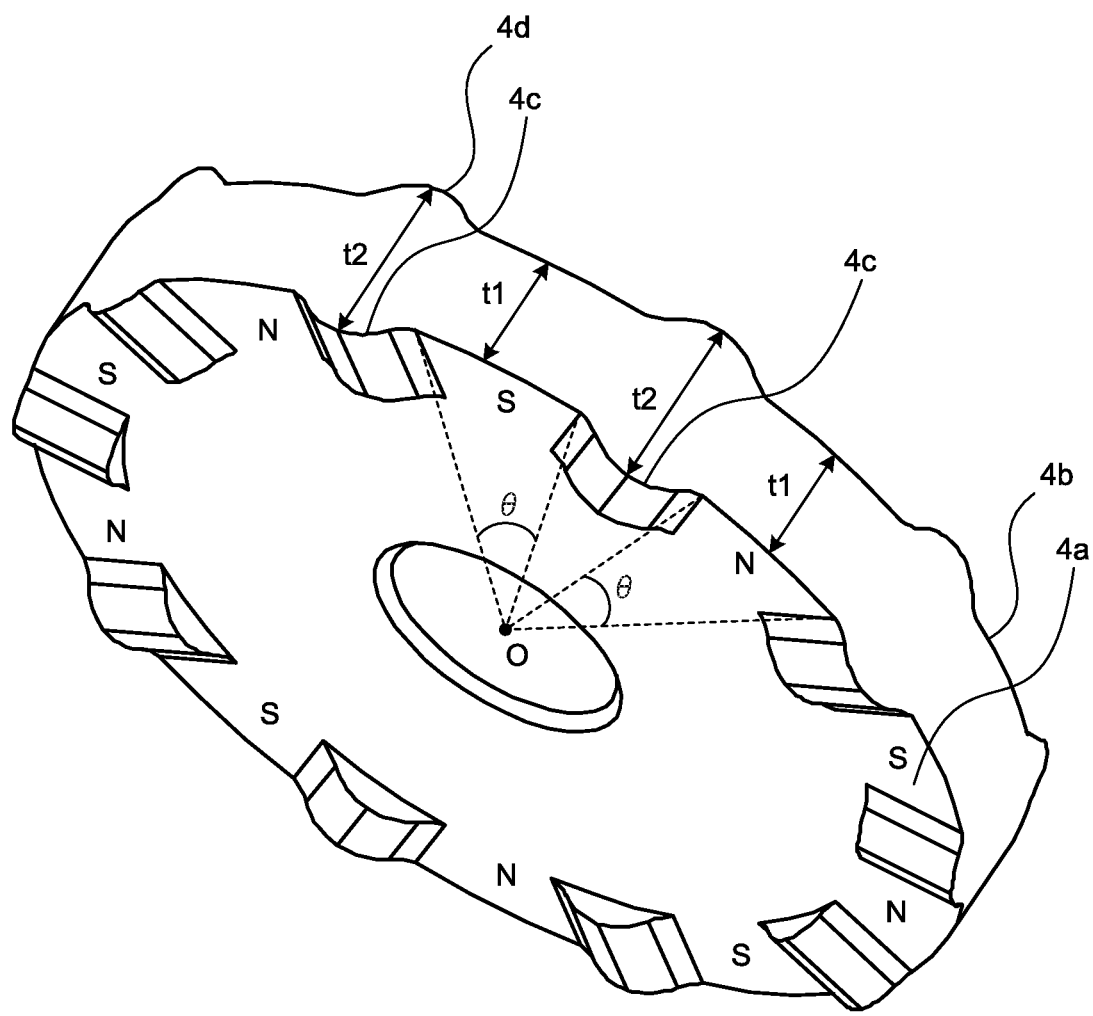
FIG. 11 is an enlarged view of the sensor magnet illustrated in FIG. 10.

FIG. 11 is an enlarged view of the sensor magnet illustrated in FIG. 10. As illustrated in FIG. 11, when t1 represents a thickness at the magnetic pole center of each of the multiple magnetic poles and t2 represents a thickness of the inter-magnetic-pole portion between adjacent magnetic poles of the multiple magnetic poles, the sensor magnet 4B is formed have its thicknesses in the axial direction thereof such that the thickness t2 is greater than the thickness t1. When θ represents an angle of a range in which the axial thickness at the center of each of the multiple magnetic poles is t1 and N represents the number of the magnetic poles of the sensor magnet 4B with the center O of the sensor magnet 4B in the radial direction of the magnet being centered, the angle θ has a value satisfying θ<230/N [deg].

Even this configuration can offer an advantage similar to the advantage of the first embodiment. In addition, the strength of the magnetic field generated from an inter-magnetic-pole portion is relatively increased as compared to the first and second embodiments, thereby enabling the accuracy of position detection to be increased.

Fourth Embodiment

Figure 12:
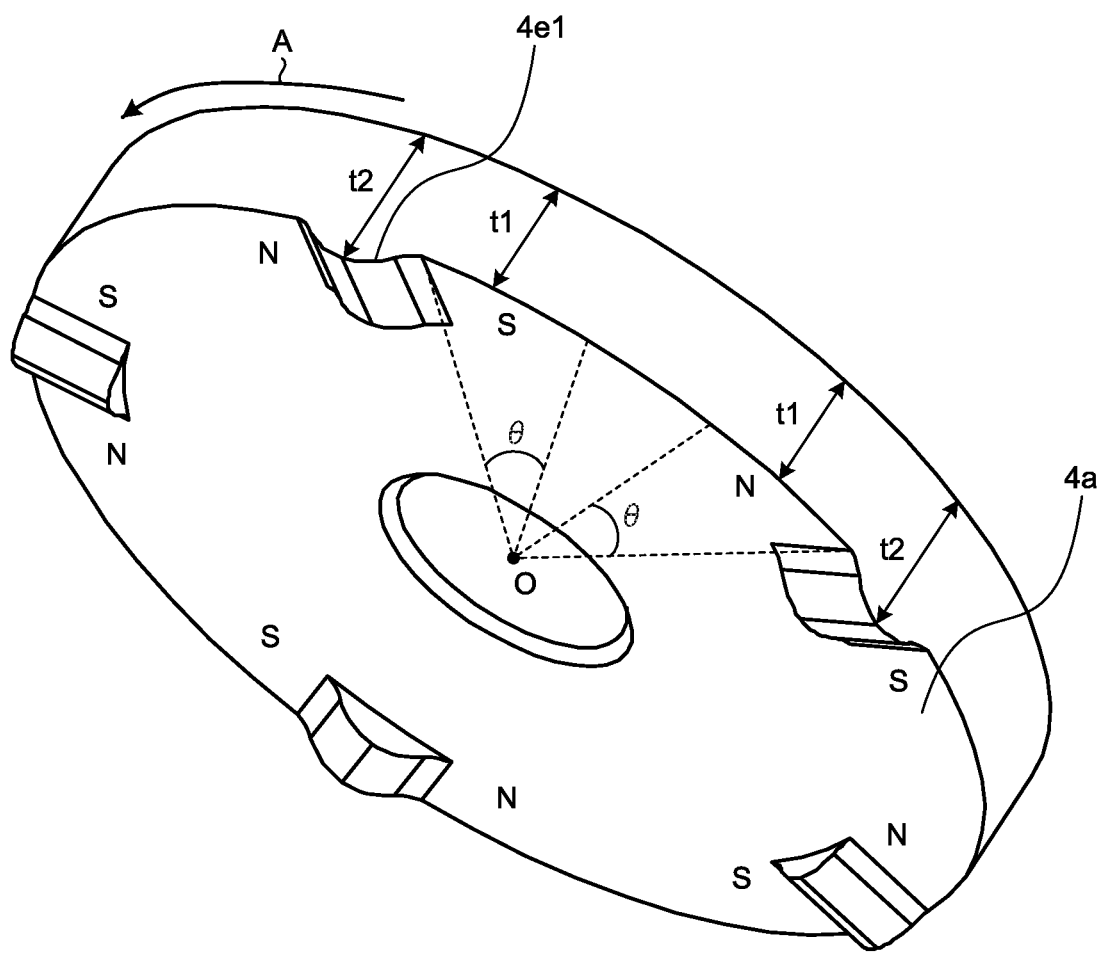
FIG. 12 is a view illustrating a first example configuration of a sensor magnet for use in the permanent-magnet synchronous motor according to a fourth embodiment of the present invention.

FIG. 12 is a view illustrating a first example configuration of a sensor magnet for use in the permanent-magnet synchronous motor according to a fourth embodiment of the present invention. The sensor magnet 4C illustrated in FIG. 12 includes multiple inter-magnetic-pole portions by which the magnetic pole detected by the magnetic sensor 5 is changed from N-pole to S-pole when the sensor magnet 4C rotates in one direction A, and includes a protrusion 4e1 on the third end face 4a in each of the multiple inter-magnetic-pole portions.

Each of the multiple protrusions 4e1 is formed by configuring the axial thicknesses of the sensor magnet 4C such that a thickness of the inter-magnetic-pole portion between adjacent magnetic poles of the multiple magnetic poles is greater than a thickness at the magnetic pole center of each of the multiple magnetic poles.

When t1 denotes a thickness at the magnetic pole center of each of the multiple magnetic poles, and t2 denotes a thickness of the inter-magnetic-pole portion between magnetic poles having change from N-pole to S-pole, the sensor magnet 4C is formed to have thicknesses in the axial direction such that the thickness t2 is greater than the thickness t1. When θ denotes an angle of a range in which an axial thickness at the center of each of the multiple magnetic poles is t1 and N denotes the number of magnetic poles of the sensor magnet 4C with the censer O of the sensor magnet 4C in the radial direction thereof being centered, the angle θ has a value satisfying θ<230/N [deg].

Figure 13:
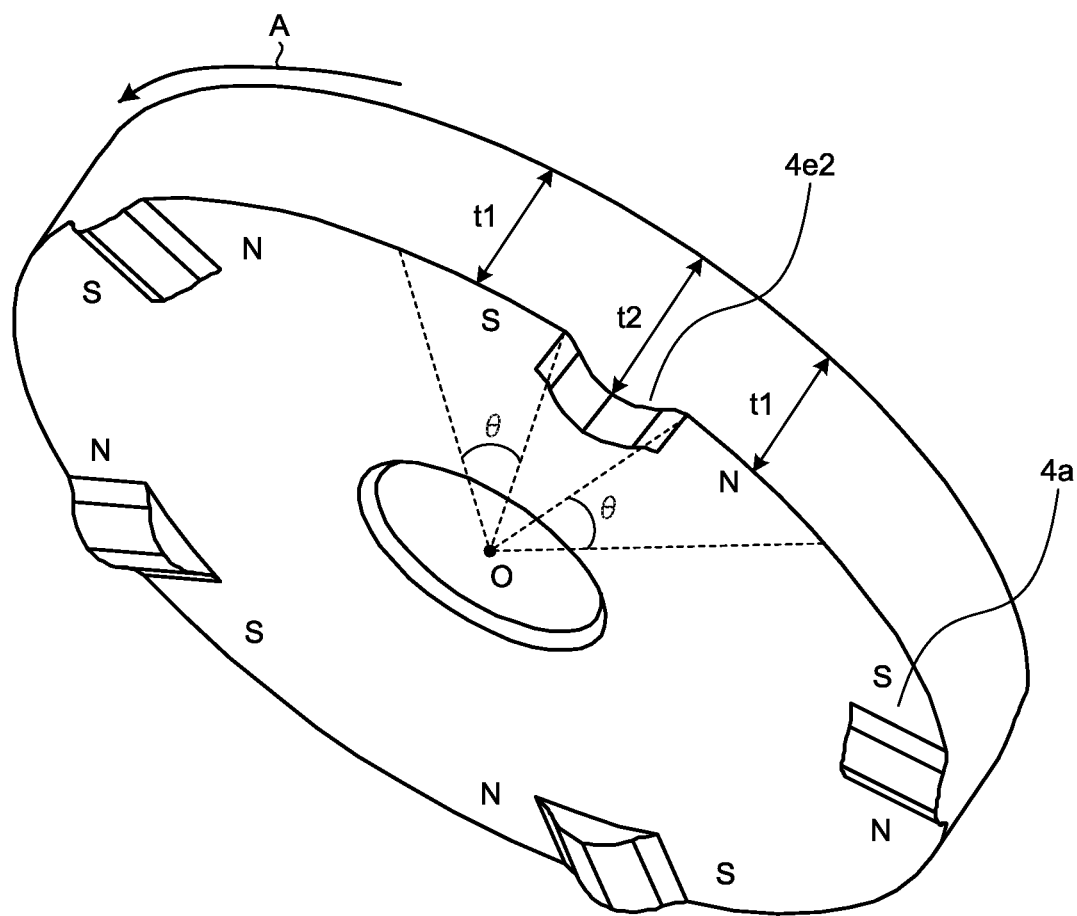
FIG. 13 is a view illustrating a second example configuration of the sensor magnet for use in the permanent-magnet synchronous motor according to the fourth embodiment of the present invention.

FIG. 13 is a view illustrating a second example configuration of the sensor magnet for use in the permanent-magnet synchronous motor according to the fourth embodiment of the present invention. The sensor magnet 4D illustrated in FIG. 13 includes multiple inter-magnetic-pole portions based on which the magnetic pole detected by the magnetic sensor 5 is changed from S-pole to N-pole when the sensor magnet 4D rotates in one direction A, and includes a protrusion 4e2 on the third end face 4a in each of the multiple inter-magnetic-pole portions.

Each of the multiple protrusions 4e2 is formed to have thicknesses of the sensor magnet 4D in the axial direction such that a thickness of the inter-magnetic-pole portions between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between magnetic poles having change from S-pole to N-pole, the sensor magnet 4D is formed to have its thicknesses in the radial direction such that the thickness t2 is greater than the thickness t1.

When θ represents an angle of a range in which an axial thickness at the center of each of the multiple magnetic poles is t1 and N represents the number of magnetic poles of the sensor magnet 4D with the center O of the sensor magnet 4D in the radial direction thereof being centered, the angle θ has a value satisfying θ<230/N [deg].

According to the sensor magnets 4C and 4D of the fourth embodiment, an advantage can be offered in that, as compared to the first embodiment, the amount of magnet material is reduced, and the accuracy of position detection can be increased while further reducing costs.

Fifth Embodiment

Figure 14:
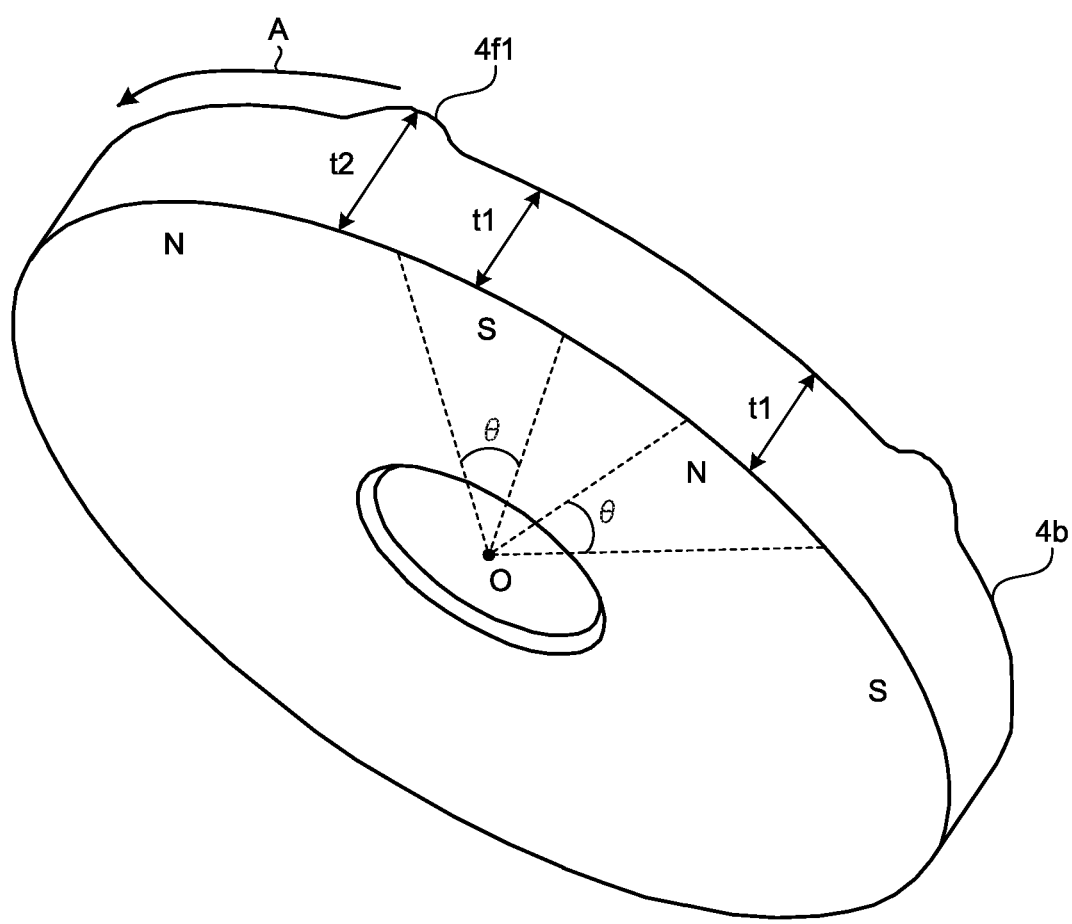
FIG. 14 is a view illustrating a first example configuration of a sensor magnet for use in the permanent-magnet synchronous motor according to a fifth embodiment of the present invention.

FIG. 14 is a view illustrating a first example configuration of a sensor magnet for use in the permanent-magnet synchronous motor according to a fifth embodiment of the present invention. The sensor magnet 4E illustrated in FIG. 14 includes multiple inter-magnetic-pole portions by which the magnetic pole detected by the magnetic sensor 5 is changed from N-pole to S-pole when the sensor magnet 4E rotates in one direction A, and includes a protrusion 4f1 on the fourth end face 4b in each of the multiple inter-magnetic-pole portions.

Each of the multiple protrusions 4f1 is formed by configuring the axial thickness of the sensor magnet 4E such that a thickness of the inter-magnetic-pole portion between adjacent magnetic poles of the multiple magnetic poles is greater than a thickness at the magnetic pole center of each of the multiple magnetic poles.

When t1 denotes a thickness at the magnetic pole center of each of the multiple magnetic poles and t2 denotes a thickness of the inter-magnetic-pole portion between magnet poles having change from N-pole to S-pole, the sensor magnet 4E is formed to have its thicknesses in the axial direction thereof such that the thickness t2 is greater than the thickness t1. When θ denotes an angle of a range in which an axial thickness at the center of each of the multiple magnetic poles is t1 and N denotes the number of magnetic poles of the sensor magnet 4E with the center O of the sensor magnet 4E in the radial direction thereof being centered, the angle θ has a value satisfying θ<230/N [deg].

Figure 15:
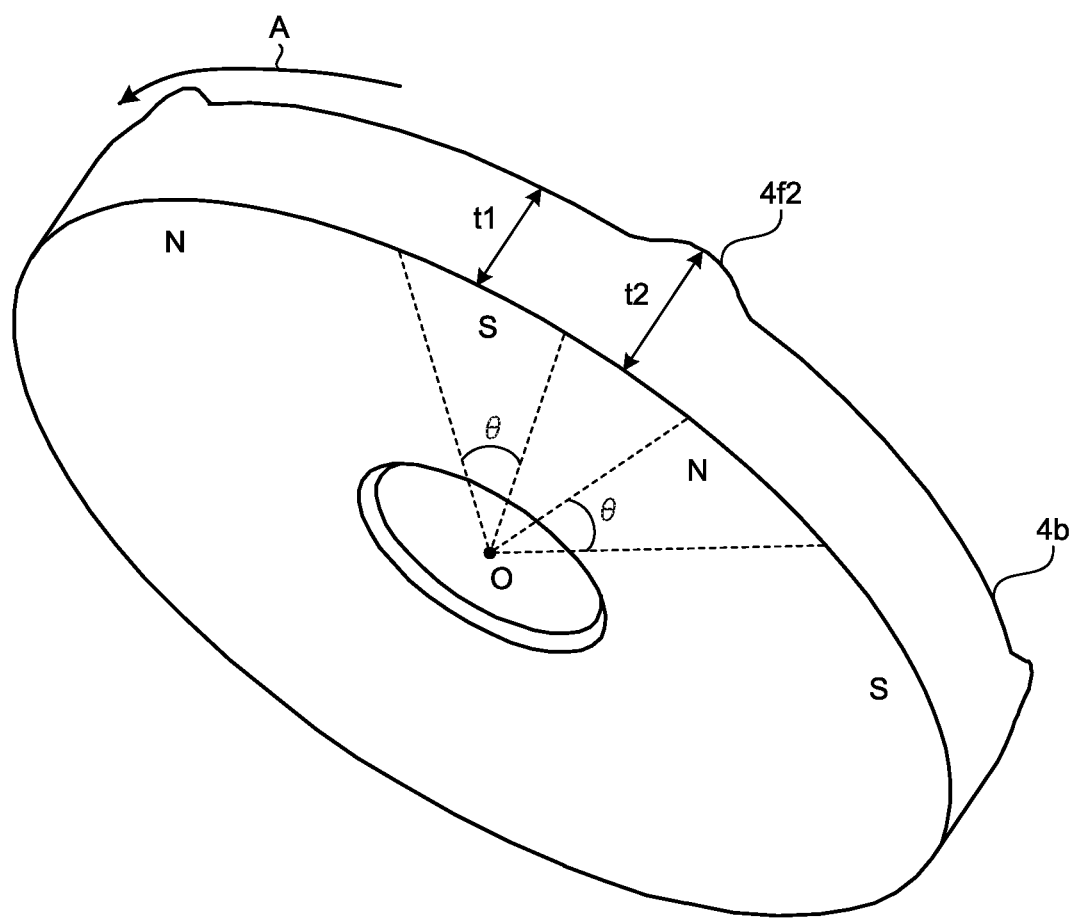
FIG. 15 is a view illustrating a second example configuration of the sensor magnet for use in the permanent-magnet synchronous motor according to the fifth embodiment of the present invention.

FIG. 15 is a view illustrating of a second example configuration of the sensor magnet for use in the permanent-magnet synchronous motor according to the fifth embodiment of the present invention. The sensor magnet 4F illustrated in FIG. 15 includes multiple inter-magnetic-pole portions by which the magnetic pole detected by the magnetic sensor 5 is changed from S-pole to N-pole when the sensor magnet 4F rotates in one direction A, and includes a protrusion 4f2 on the fourth end face 4b in each of the multiple inter-magnetic-pole portions.

Each of the multiple protrusions 4f2 is formed by configuring the axial thickness of the sensor magnet 4F such that a thickness of the inter-magnetic-pole portions between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between magnetic poles having change from S-pole to N-pole, the sensor magnet 4F is formed to have its thicknesses in the axial direction such that the thickness t2 is greater than the thickness t1.

When θ represents an angle of a range in which an axial thickness at the center of each of the multiple magnetic poles is t1 and N denotes the number of magnetic poles of the sensor magnet 4F with the center O of the sensor magnet 4F in the radial direction thereof being centered, the angle θ has a value satisfying θ<230/N [deg].

In the sensor magnets 4E and 4F of the fifth embodiment, it is advantageously possible to, as compared to the first embodiment, reduce the amount of magnet material, and increase the accuracy of position detection with costs being lowered.

Sixth Embodiment

Figure 16:
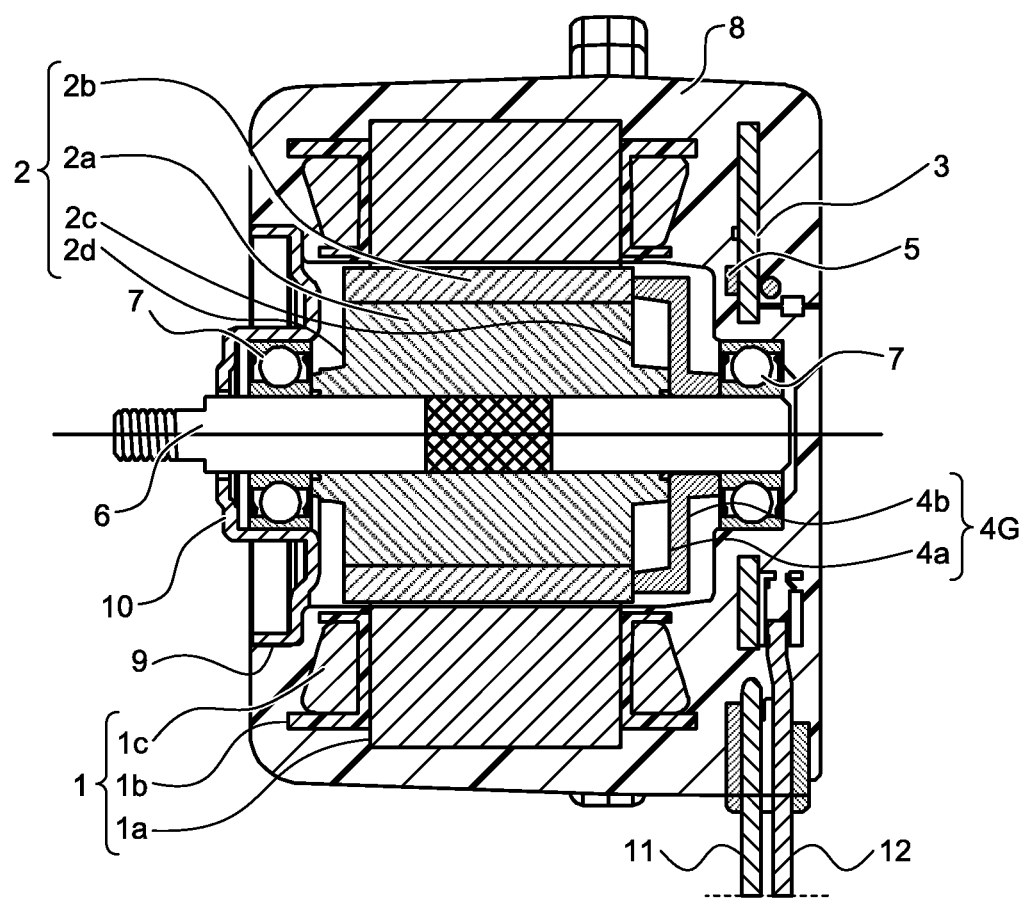
FIG. 16 is a cross-sectional view of the permanent-magnet synchronous motor according to a sixth embodiment of the present invention.

FIG. 16 is a cross-sectional view of the permanent-magnet synchronous motor according to a sixth embodiment of the present invention. The motor 100 of the sixth embodiment uses a sensor magnet 4G in place of the sensor magnet 4 of the first embodiment.

Figure 17:
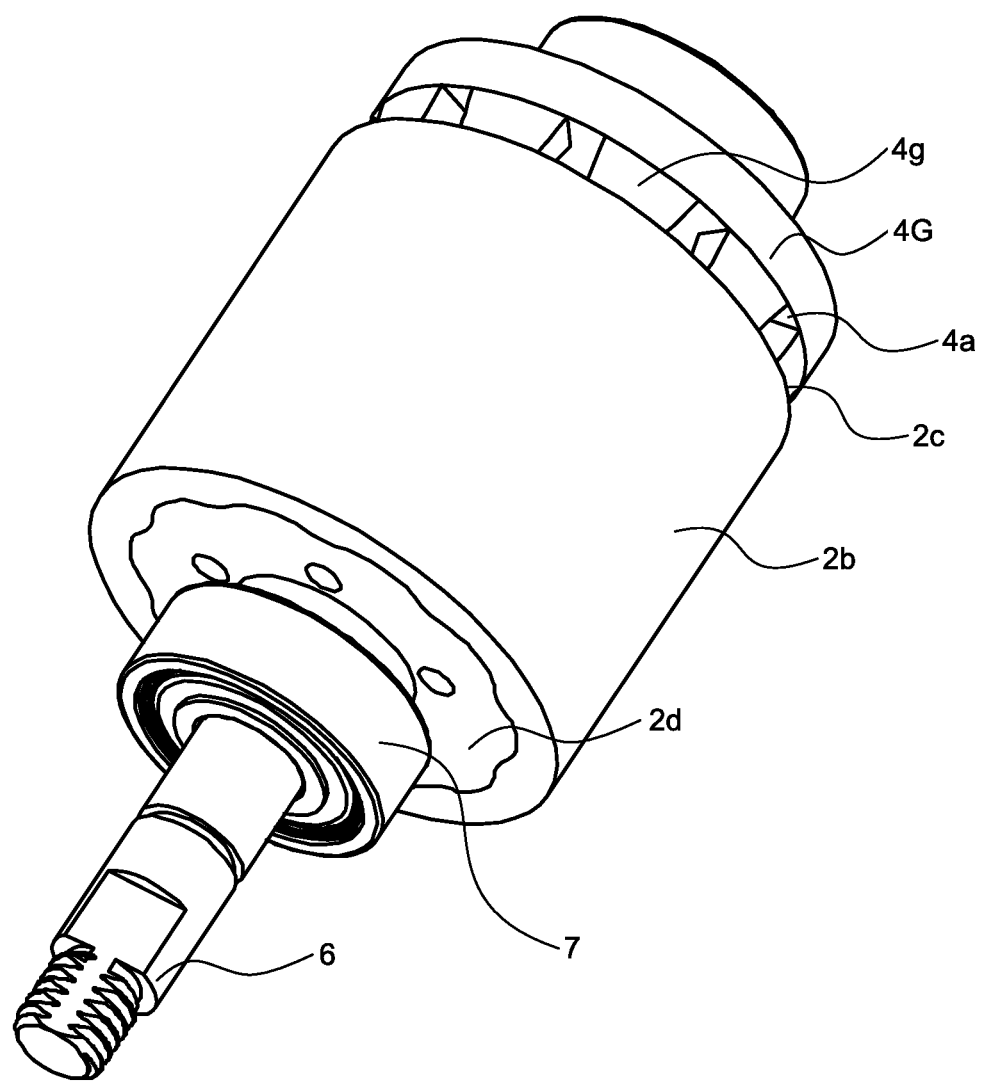
FIG. 17 is a perspective view of the rotor and the sensor magnet of the permanent-magnet synchronous motor according to the sixth embodiment.

FIG. 17 is a perspective view of the rotor and the sensor magnet of the permanent-magnet synchronous motor according to the sixth embodiment. The sensor magnet 4G of the sixth embodiment includes multiple protrusions 4g on the third end face 4a. The multiple protrusions 4g each extend from the third end face 4a toward the first end face 2c of the rotor 2, and a tip of each protrusion 4g is in contact with the first end face 2c of the rotor 2.

Figure 18:
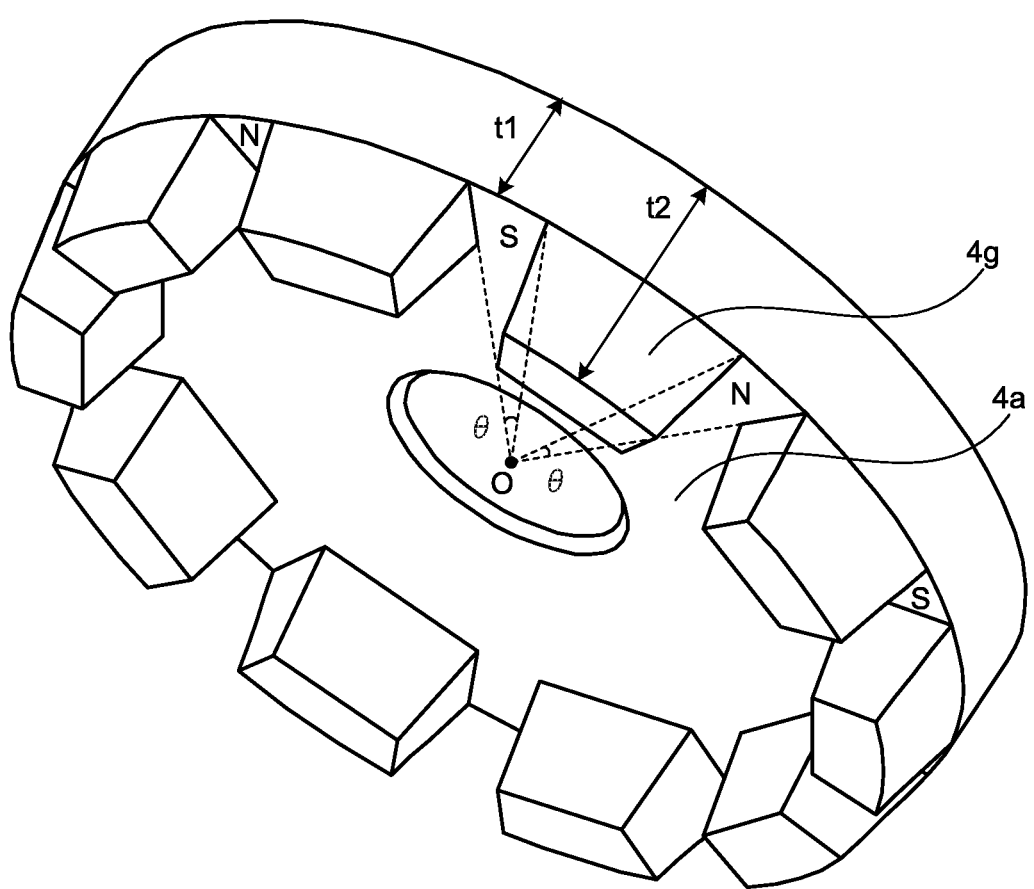
FIG. 18 is an enlarged view of the sensor magnet illustrated in FIG. 17.

FIG. 18 is an enlarged view of the sensor magnet illustrated in FIG. 17. Each of the multiple protrusions 4g is formed by configuring the axial thickness of the sensor magnet 4G such that a thickness of the inter-magnetic-pole portion between adjacent magnetic poles of the multiple magnetic poles is greater than a thickness at the magnetic pole center of each of the multiple magnetic poles.

When t1 denotes a thickness at the magnetic pole center of each of the multiple magnetic poles and t2 denotes a thickness of the inter-magnetic-pole portion between adjacent magnetic poles of the multiple magnetic poles, the sensor magnet 4G is formed to have thicknesses of the sensor magnet 4G in the axial direction thereof such that the thickness t2 is greater than the thickness t1. When θ denotes an angle of a range in which an axial thickness at the center of each of the multiple magnetic poles is t1 and N denotes the number of the magnetic poles of the sensor magnet 4G with the center O of the sensor magnet 4G in the radial direction thereof being centered, the angle θ has a value satisfying θ<230/N [deg].

An important factor for increasing the strength of the magnetic field inputted to the magnetic sensor is a position of the sensor magnet 4G along the rotary shaft. Use of a configuration in which the thickness t2 of the inter-magnetic-pole portion of the sensor magnet 4G is a thickness enough to allow the sensor magnet 4G to make contact with an element forming the rotor 2 can improve a positioning accuracy in the axial direction.

In addition, the configuration of the sixth embodiment allows the tip of each of the protrusions 4g to make contact with the first end face 2c, and thus the sensor magnet 4G to be stably mounted on the first end face 2c of the rotor 2, thereby making it possible to position the sensor magnet 4G with high positioning accuracy. Moreover, since the tip of each of the multiple protrusions 4g has a flat shape parallel to the first end face 2c, the sensor magnet 4G is more stably mounted, thereby enabling still higher positioning accuracy.

Although the sixth embodiment has been described for the example configurations in which the tips of all the multiple protrusions 4g make contact with the rotor 2, the sensor magnet 4G may be configured such that at least three protrusions 4g make contact with the rotor 2, and the other one or multiple protrusions 4g do not make contact with the rotor 2. When t3 denotes an axial thickness of the multiple protrusions 4g that make contact with the rotor 2, t4 denotes an axial thickness of the one or multiple protrusions 4g that do not make contact with the rotor 2, and t1 denotes a thickness at the magnetic pole center described above, a relationship of t1<t4<t3 holds. Needless to say, since the sensor magnet is configured such that the tips of all the multiple protrusions 4g make contact with the rotor 2, a relational expression is t1<t2.

Seventh Embodiment

Figure 19:
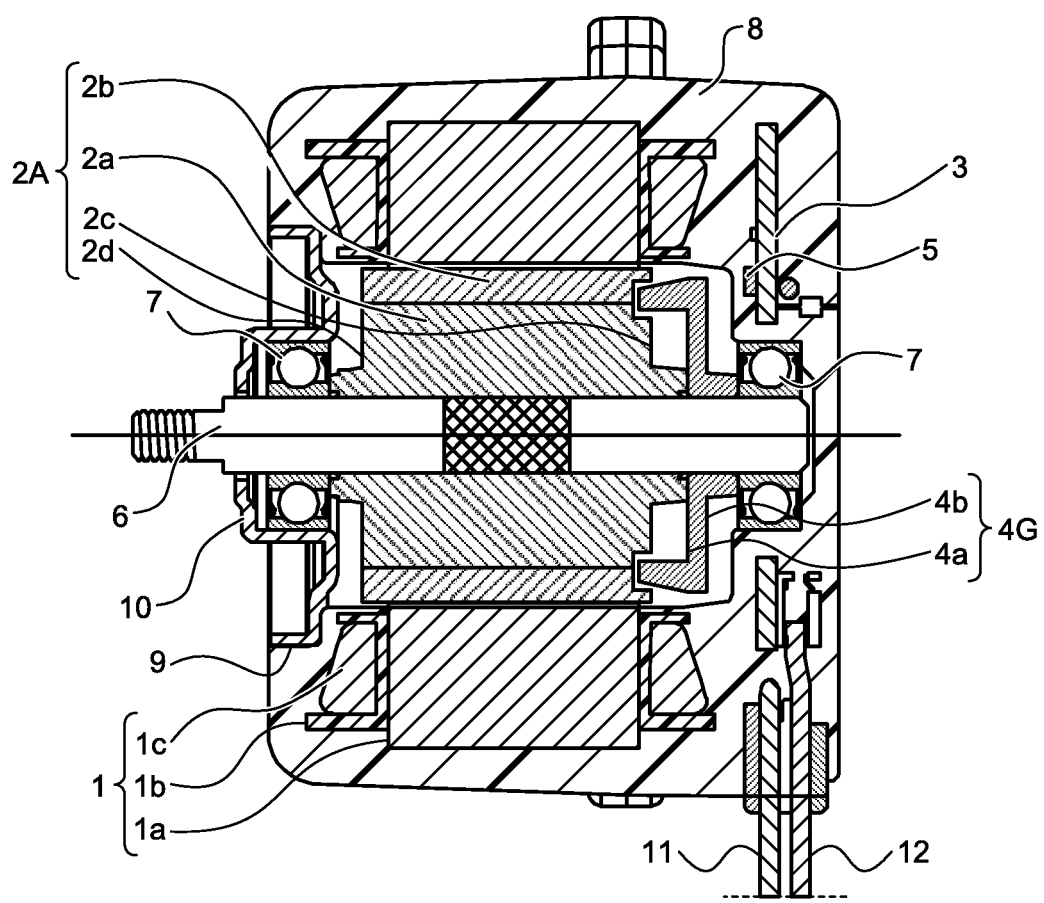
FIG. 19 is a cross-sectional view of the permanent-magnet synchronous motor according to a seventh embodiment of the present invention.

FIG. 19 is a cross-sectional view of the permanent-magnet synchronous motor according to a seventh embodiment of the present invention. The motor 100 of the seventh embodiment uses a rotor 2A in place of the rotor 2 of the sixth embodiment.

Figure 20:
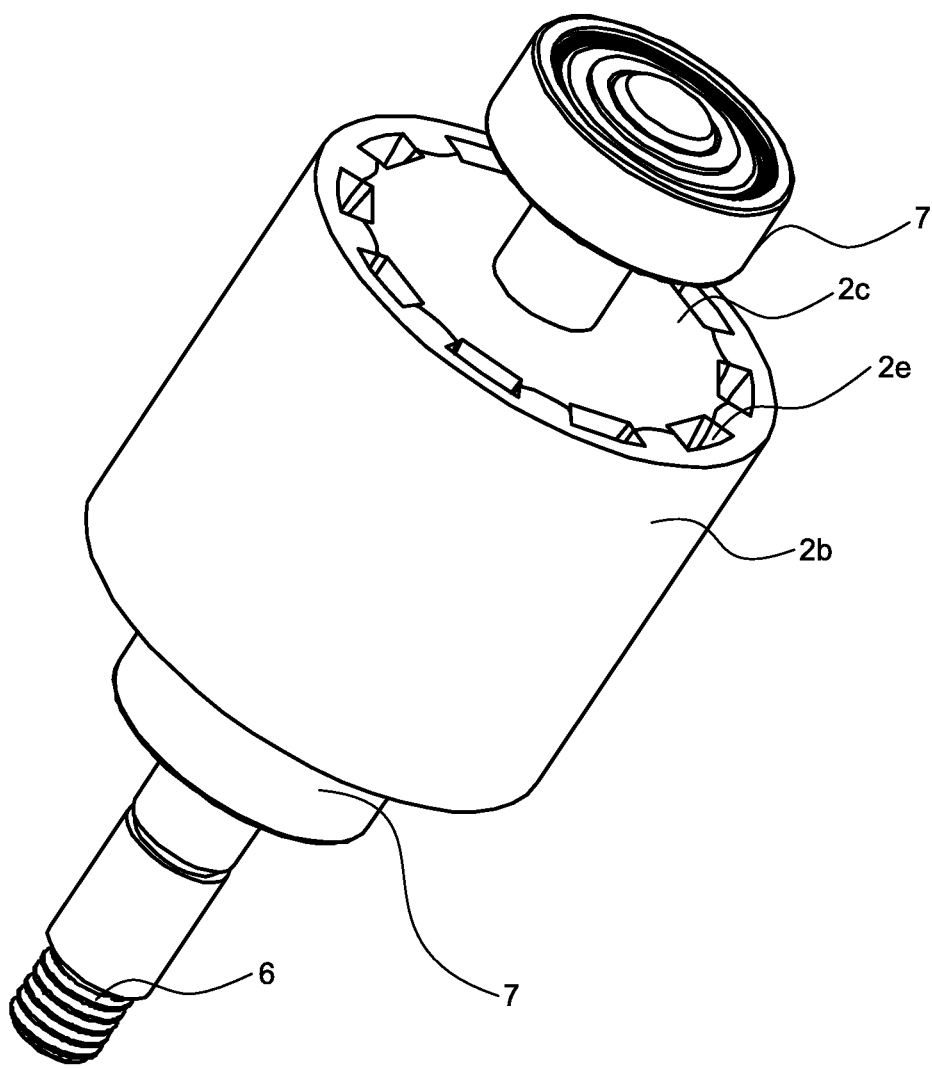
FIG. 20 is a perspective view of the rotor of the permanent-magnet synchronous motor according to the seventh embodiment.

FIG. 20 is a perspective view of the rotor of the permanent-magnet synchronous motor according to the seventh embodiment. FIG. 20 omits the sensor magnet 4G illustrated in FIG. 19, and illustrates the rotor 2A as viewed from the side farther from the load. The rotor 2A has multiple recesses 2e on the first end face 2c. The multiple recesses 2e respectively receive therein the leading ends of the multiple protrusions 4g formed in the sensor magnet 4G. The multiple recesses 2e are formed on the first end face 2c side of the rotor 2A, circumferentially spaced apart from each other.

In FIG. 20, the multiple recesses 2e are formed between the outer circumferential surface of the back yoke 2a and the inner circumferential surface of the main magnet 2b. However, for example, the multiple recesses 2e may be formed on the first end face 2c of the back yoke 2a in a radially inner portion with respect to the outer circumferential surface of the back yoke 2a, or may be formed on the first end face 2c of the main magnet 2b in a radially outer portion with respect to the inner circumferential surface of the main magnet 2b.

Even this configuration provides an advantage similar to the advantage of the sensor magnet 4 of the first embodiment, and moreover, the leading ends of the multiple protrusions 4g formed in the sensor magnet 4G are fit in the recesses 2e. Accordingly, circumferential misalignment of the sensor magnet 4G is prevented, and misalignment of the magnetic pole positions between the main magnet 2b and the sensor magnet 4G is prevented, thereby enabling higher accuracy positioning.

Eighth Embodiment

Figure 21:
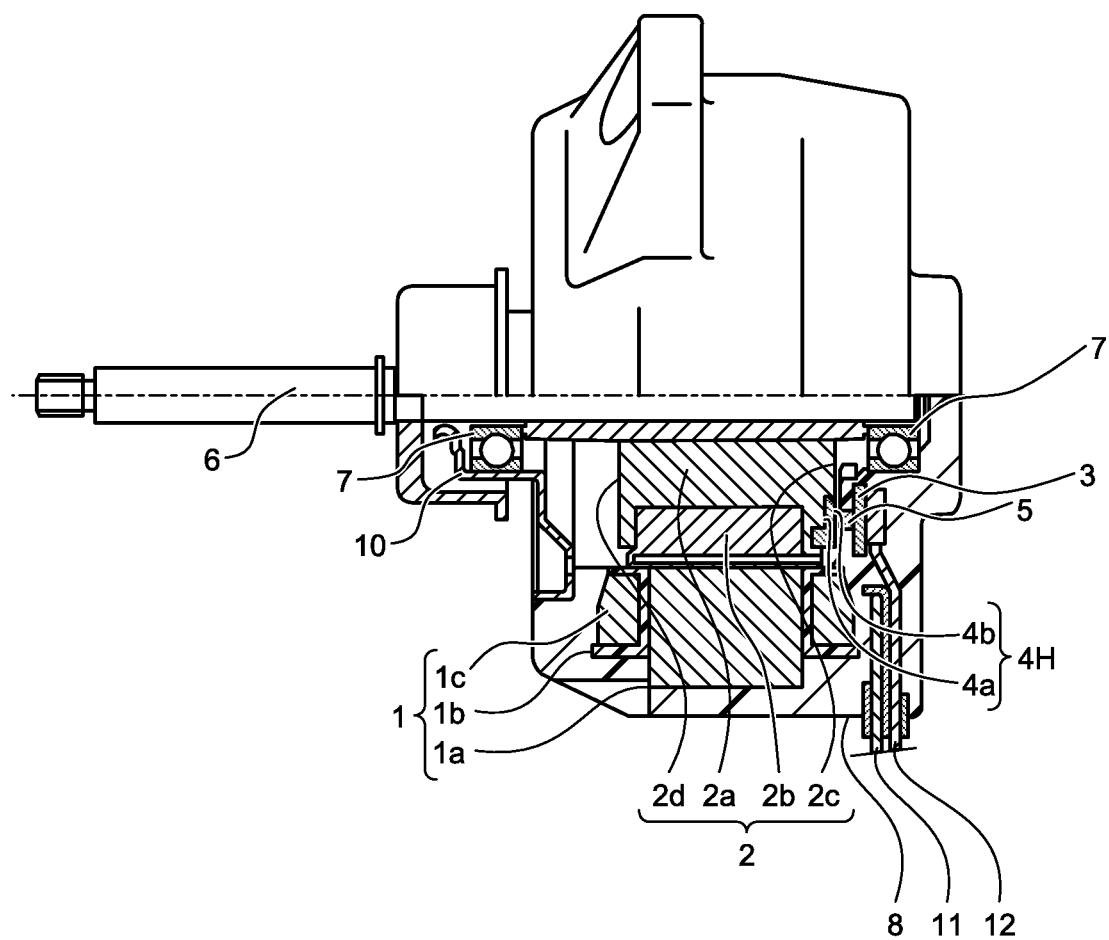
FIG. 21 is a cross-sectional view of the permanent-magnet synchronous motor according to an eighth embodiment of the present invention.

FIG. 21 is a cross-sectional view of the permanent-magnet synchronous motor according to an eighth embodiment of the present invention. The motor of the eighth embodiment uses a sensor magnet 4H in place of the sensor magnet 4 of the first embodiment. The motor of the eighth embodiment differs from the motor of the first embodiment in that the third end face 4a of the sensor magnet 4H makes contact, via a resin material, with the first end face 2c of the main magnet 2b of the rotor 2.

Figure 22:
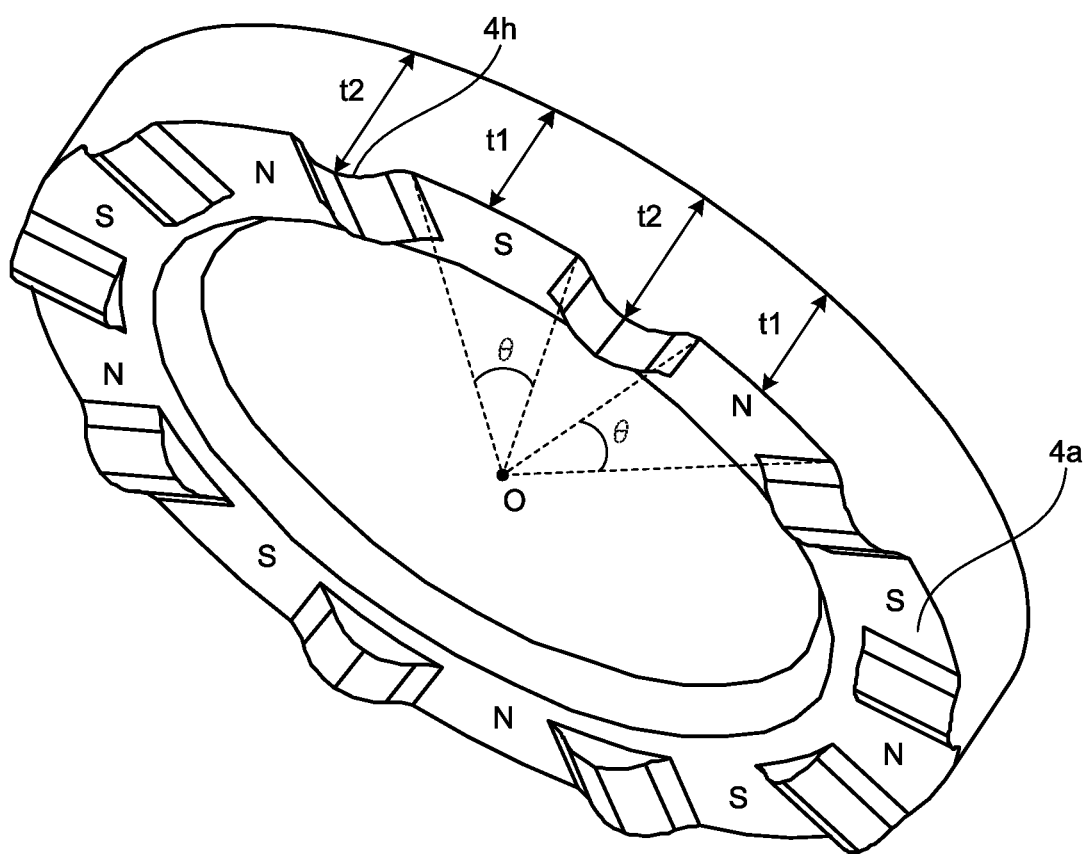
FIG. 22 is a view illustrating a first example configuration of the sensor magnet illustrated in FIG. 21.

FIG. 22 is a view illustrating a first example configuration of the sensor magnet illustrated in FIG. 21. The sensor magnet 4H illustrated in FIG. 22 includes multiple protrusions 4h formed on the third end face 4a in the inter-magnetic-pole portions.

The multiple protrusions 4h are formed by configuring the axial thickness of the sensor magnet 4H such that a thickness of the inter-magnetic-pole portion between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between adjacent magnetic poles of the multiple magnetic poles, the sensor magnet 4H is formed to have its thicknesses in the axial direction such that the thickness t2 is greater than the thickness t1.

When $\theta$ denotes an angle of a range in which an axial thickness at the center of each of the multiple magnetic poles is t1 and N denotes the number of magnetic poles of the sensor magnet 4H with the center O of the sensor magnet 4H in the radial direction being centered, the angle $\theta$ has a value satisfying $\theta$<230/N [deg].

Figure 23:
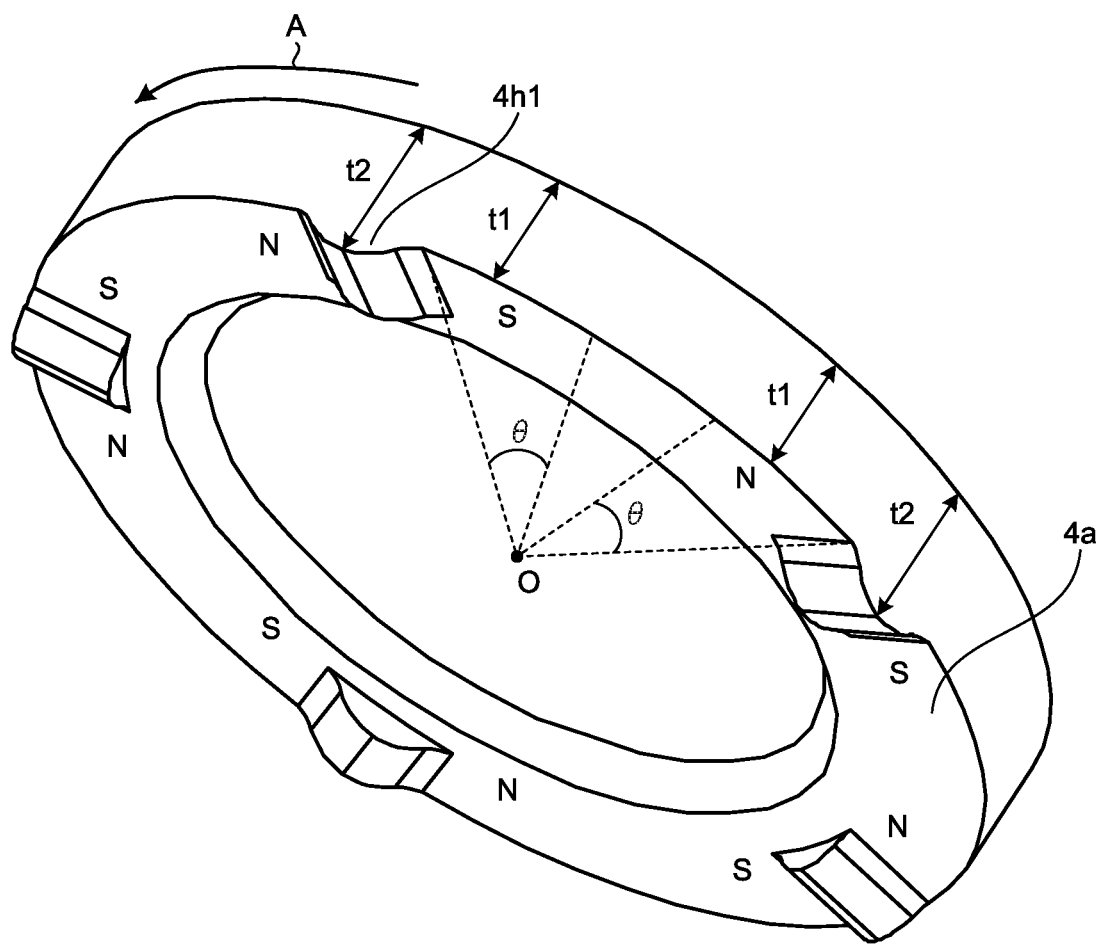
FIG. 23 is a view illustrating a second example configuration of the sensor magnet illustrated in FIG. 21.

FIG. 23 is a view illustrating a second example configuration of the sensor magnet illustrated in FIG. 21. The sensor magnet 4H illustrated in FIG. 23 includes multiple protrusions 4h1 formed on the third end face 4a, which respectively correspond to the multiple inter-magnetic-pole portions by which the magnetic pole detected by the magnetic sensor 5 is changed from N-pole to S-pole when the sensor magnet 4H rotates in one direction A.

Each of the multiple protrusions 4h1 is formed by configuring the axial thickness of the sensor magnet 4H such that a thickness of the inter-magnetic-pole portion between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between magnetic poles having change from N-pole to S-pole, the sensor magnet 4H is formed to have its thicknesses in the axial direction such that the thickness t2 is greater than the thickness t1.

When $\theta$ represents an angle of a range in which an axial thickness at the center of each of the multiple magnetic poles is t1 and N represents the number of magnetic poles of the sensor magnet 4H with the center O of the sensor magnet 4H in the radial direction thereof being centered, the angle $\theta$ has a value satisfying $\theta$<230/N [deg].

Figure 24:
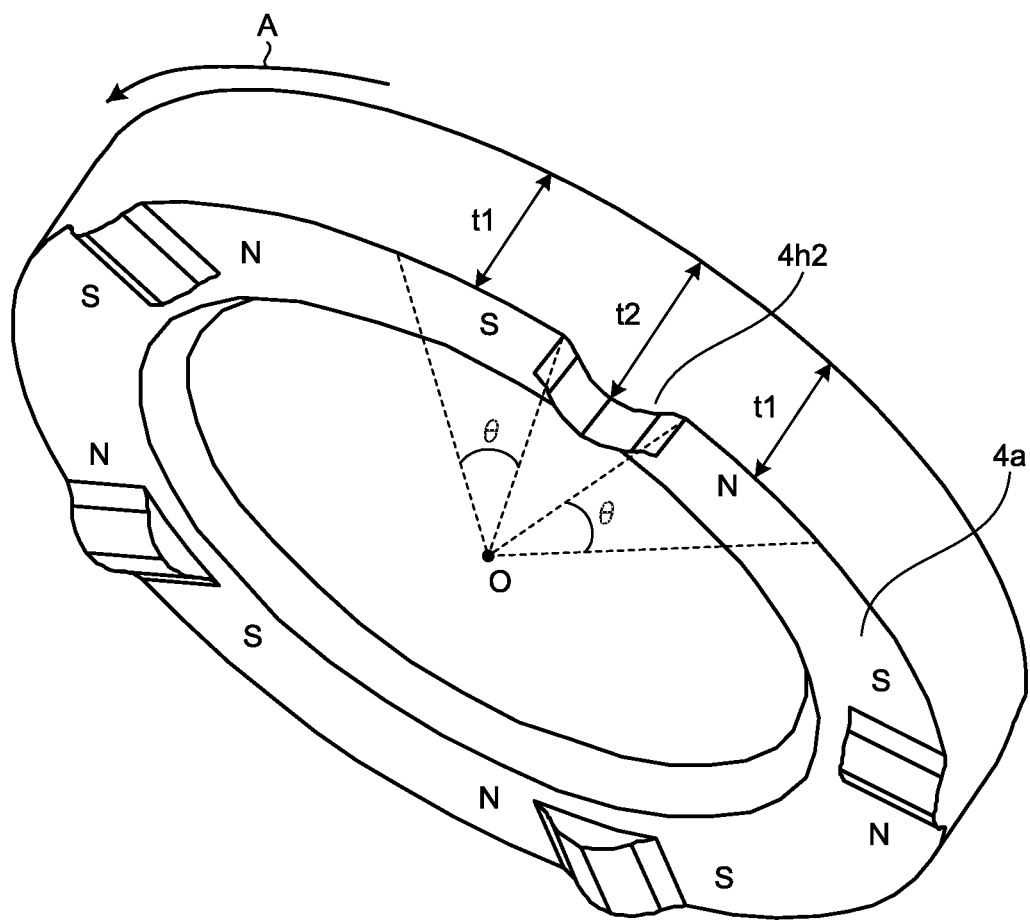
FIG. 24 is a view illustrating a third example configuration of the sensor magnet illustrated in FIG. 21.

FIG. 24 is a view illustrating a third example configuration of the sensor magnet illustrated in FIG. 21. The sensor magnet 4H illustrated in FIG. 24 includes multiple protrusions 4h2 formed on the third end face 4a, which respectively correspond to the multiple inter-magnetic-pole portions by which the magnetic pole detected by the magnetic sensor 5 is changed from S-pole to N-pole when the sensor magnet 4H rotates in one direction A.

The multiple protrusions 4h2 are formed by configuring the axial thickness of the sensor magnet 4H such that a thickness of the inter-magnetic-pole portion between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the multiple inter-magnetic-pole portion between magnetic poles having transition from S-pole to N-pole, the sensor magnet 4H is formed to have its thicknesses in the axial direction of the sensor magnet 4H such that the thickness t2 is greater than the thickness t1.

When $\theta$ represents an angle of a range in which an axial thickness at the center of each of the multiple magnetic poles is t1 and N represents the number of magnetic poles of the sensor magnet 4H with the center O of the sensor magnet 4H in the radial direction being centered, the angle $\theta$ has a value satisfying $\theta$<230/N [deg].

According to the sensor magnet 4H of the eighth embodiment, an advantage can be offered in that, as compared to the sensor magnet 4 of the first embodiment, the amount of magnet material of a radially inward portion is reduced, and therefore the accuracy of position detection is increased at even lower cost.

Ninth Embodiment

Figure 25:
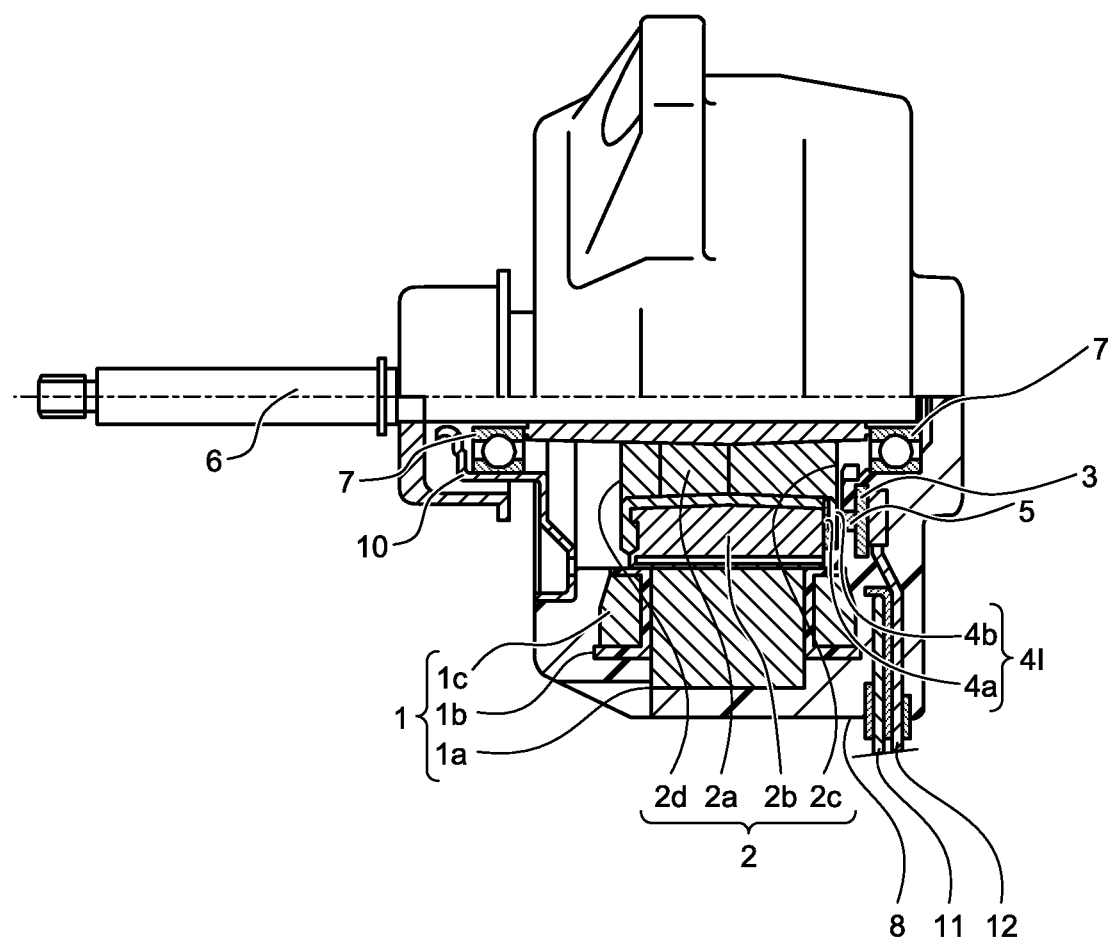
FIG. 25 is a cross-sectional view of the permanent-magnet synchronous motor according to a ninth embodiment of the present invention.

FIG. 25 is a cross-sectional view of the permanent-magnet synchronous motor according to a ninth embodiment of the present invention. The motor of the ninth embodiment uses a sensor magnet 4I in place of the sensor magnet 4A of the second embodiment. The motor of the ninth embodiment differs from the motor of the second embodiment in that the third end face 4a of the sensor magnet 4I makes contact, via a resin material, with the first end face 2c of the main magnet 2b of the rotor 2.

Figure 26:
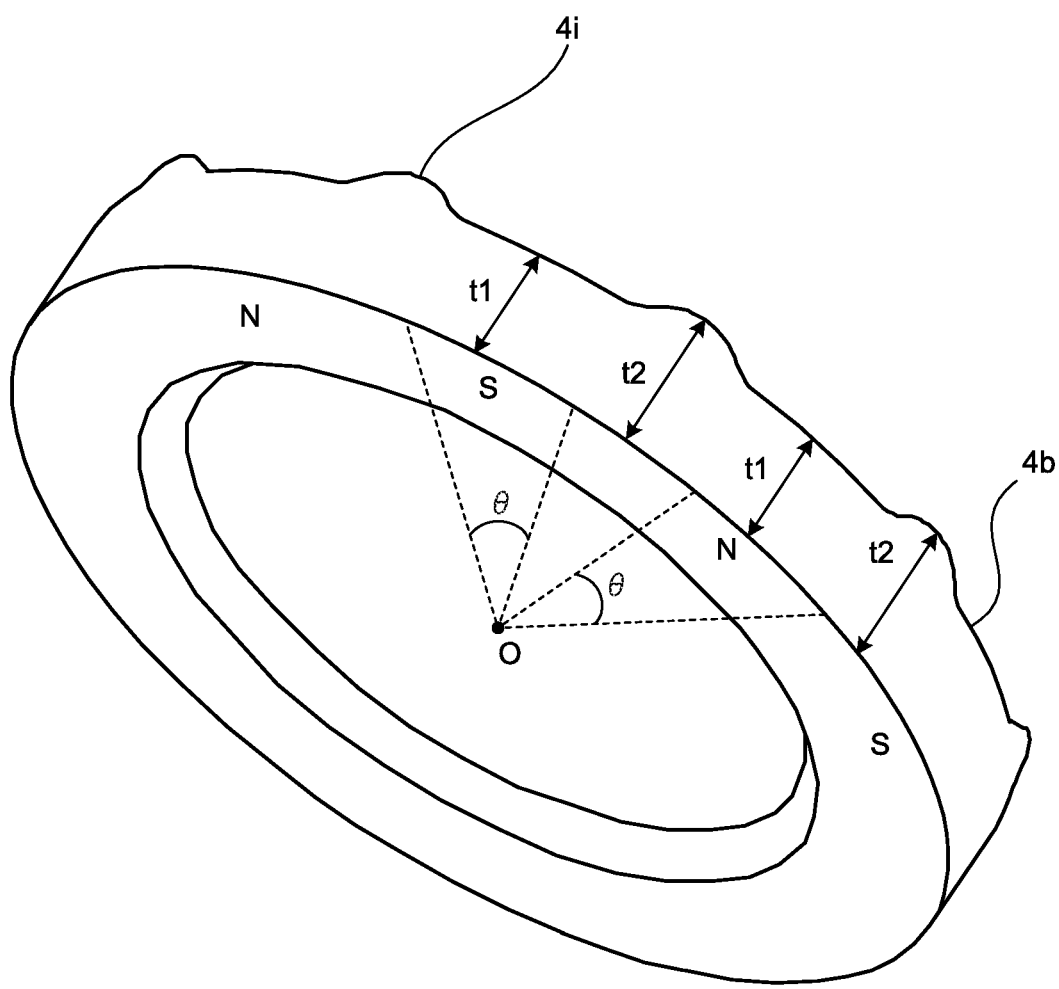
FIG. 26 is a view illustrating a first example configuration of the sensor magnet illustrated in FIG. 25.

FIG. 26 is a view illustrating a first example configuration of the sensor magnet illustrated in FIG. 25. The sensor magnet 4I of the ninth embodiment includes multiple protrusions 4i formed on the fourth end face 4b in the inter-magnetic-pole portions.

The multiple protrusions 4i are formed by configuring the axial thickness of the sensor magnet 4I such that a thickness of the inter-magnetic-pole portions between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between adjacent magnetic poles of the multiple magnetic poles, the sensor magnet 4I is formed to have its thicknesses in the axial direction of the sensor magnet such that the thickness t2 is greater than the thickness t1.

When θ represents an angle of a range in which an axial thickness at the center of each of the multiple magnetic poles is t1 and N represents the number of magnetic poles of the sensor magnet 4I with the center O of the sensor magnet 4I in the radial direction being centered, the angle θ has a value satisfying θ<230/N [deg].

Figure 27:
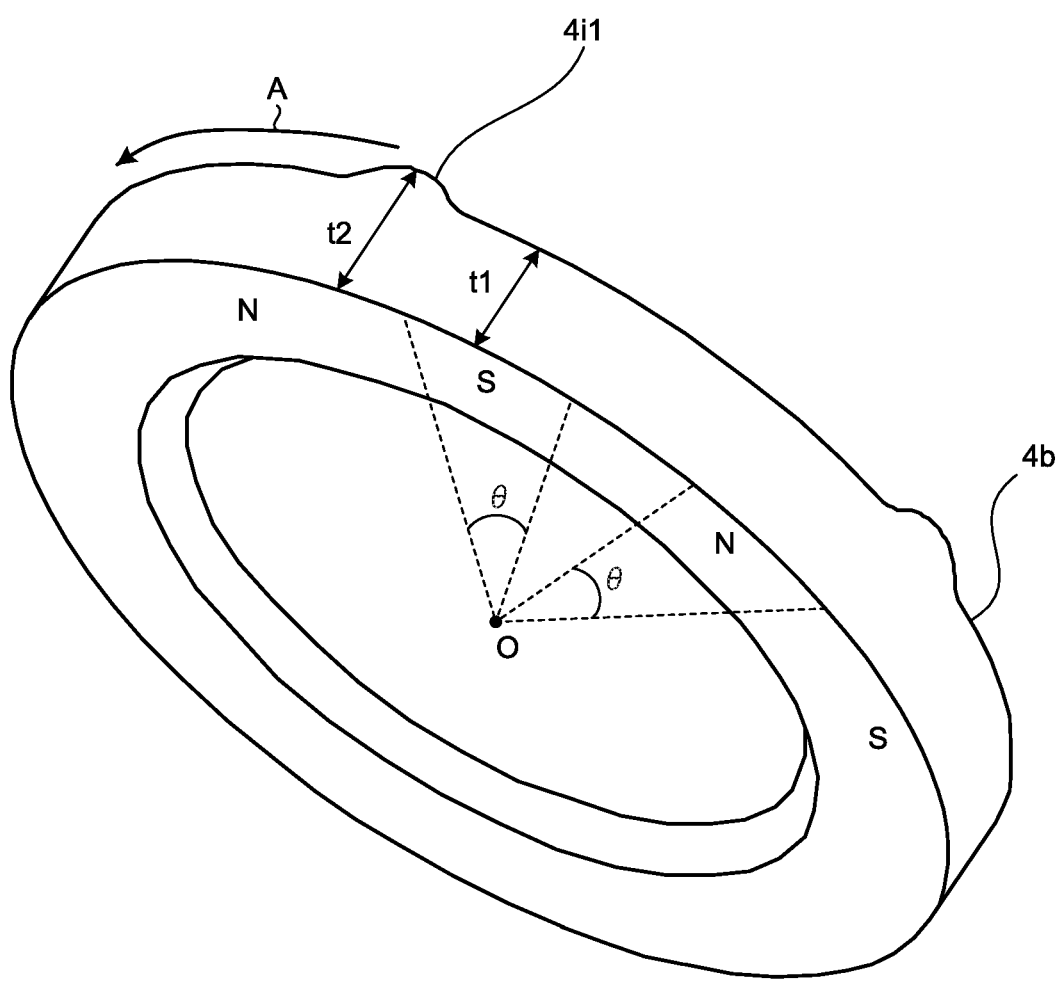
FIG. 27 is a view illustrating a second example configuration of the sensor magnet illustrated in FIG. 25.

FIG. 27 is a view illustrating a second example configuration of the sensor magnet illustrated in FIG. 25. The sensor magnet 4I illustrated in FIG. 27 includes multiple protrusions 4i1 formed on the fourth end face 4b, which respectively correspond to the multiple inter-magnetic-pole portions by which the magnetic pole detected by the magnetic sensor 5 is changed from N-pole to S-pole when the sensor magnet 4I rotates in one direction A.

The multiple protrusions 4i1 are formed by configuring the axial thickness of the sensor magnet 4I such that a thickness of the inter-magnetic-pole portion between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the inter-magnetic-pole portion between magnetic poles having change from N-pole to S-pole, the sensor magnet 4I is formed to have its thicknesses in the axial direction of the sensor magnet 4I such that the thickness t2 is greater than the thickness t1.

When θ represents an angle of a range in which an axial thickness at the center of each of the multiple magnetic poles is t1 and N represents the number of magnetic poles of the sensor magnet 4I with the center O of the sensor magnet 4I in the radial direction being centered, the angle θ has a value satisfying θ<230/N [deg].

Figure 28:
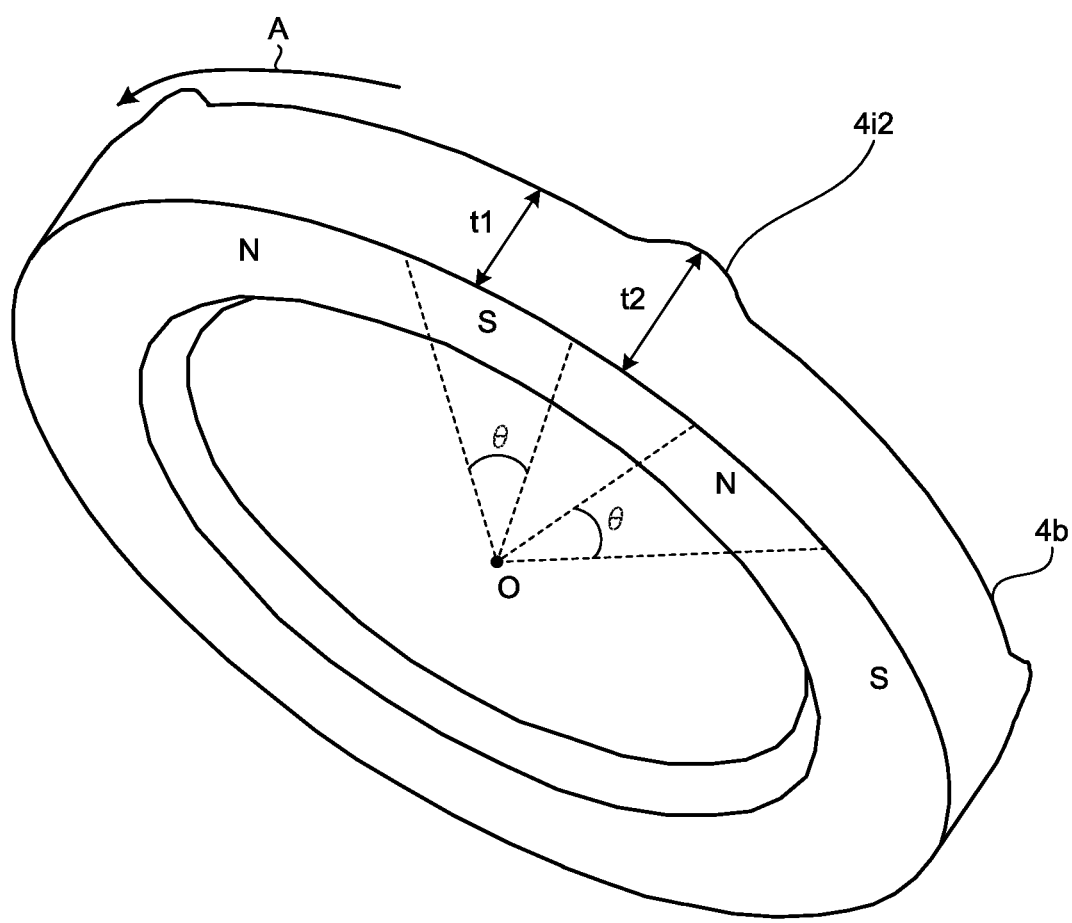
FIG. 28 is a view illustrating a third example configuration of the sensor magnet illustrated in FIG. 25.

FIG. 28 is a view illustrating a third example configuration of the sensor magnet illustrated in FIG. 25. The sensor magnet 4I illustrated in FIG. 28 includes multiple protrusions 4i2 formed on the fourth end face 4b, which respectively correspond to the multiple inter-magnetic-pole portions based on which the magnetic pole detected by the magnetic sensor 5 is changed from S-pole to N-pole when the sensor magnet 4I rotates in one direction A.

The multiple protrusions 4i2 are formed by configuring the axial thickness of the sensor magnet 4I such that a thickness of the inter-magnetic-pole portion between adjacent magnetic poles of the multiple magnetic poles is greater than a thickness at the magnetic pole center of each of the multiple magnetic poles. When t1 denotes a thickness at the magnetic pole center of each of the multiple magnetic poles and t2 denotes a thickness of the multiple inter-magnetic-pole portion between magnetic poles having transition from S-pole to N-pole, the sensor magnet 4I is formed to have its thicknesses in the axial direction of the sensor magnet 4I such that the thickness t2 is greater than the thickness t1.

When θ represents an angle of a range in which an axial thickness at the center of each of the multiple magnetic poles is t1 and N represents the number of magnetic poles of the sensor magnet 4I with the center O of the sensor magnet 4I in the radial direction being centered, the angle θ has a value satisfying θ<230/N [deg].

According to the sensor magnet 4I of the ninth embodiment, it is possible to realize an advantage in that, as compared to the sensor magnet 4A of the second embodiment, the amount of magnet material of a radially inward portion is reduced, and the accuracy of position detection can be increase with the costs being further reduced.

Tenth Embodiment

Figure 29:
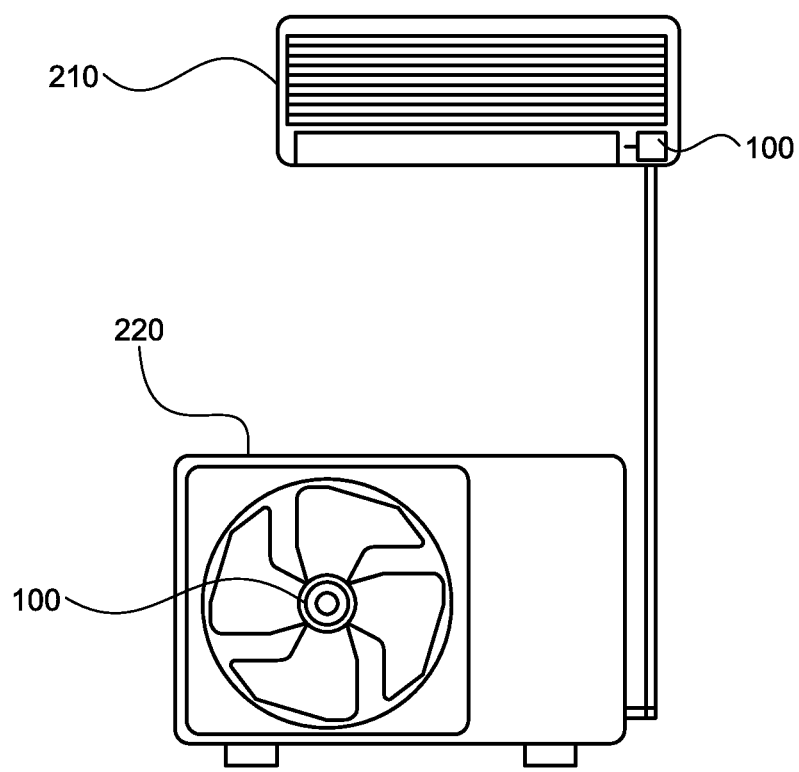
FIG. 29 is a configuration diagram of an air conditioner according to a tenth embodiment of the present invention.

FIG. 29 is a configuration diagram of an air conditioner according to a tenth embodiment of the present invention. An air conditioner 200 includes an indoor unit 210 and an outdoor unit 220 connected to the indoor unit 210. The indoor unit 210 and the outdoor unit 220 each include the motor 100 as a drive source of a blower therefor.

Use of the motor 100 as a blower motor enables the accuracy of detection of a magnetic pole position to be improved while dependence of the sensitivity of the magnetic sensor 5 on the accuracy of position detection is lowered. As a result, a higher quality air conditioner 200 can be obtained. Note that the motor 100 can also be incorporated and used in devices such as, for example, a ventilator, a household appliance, and a machine tool in addition to the air conditioner 200, and use of the motor 100 in these devices enables their qualities to be improved.

The first to ninth embodiments have been described in terms of example configurations in which the thickness t2 of the inter-magnetic-pole portions and the thickness t1 at the magnetic pole center satisfy a relationship of t1<t2, but in addition, use of the thickness t2 that is 1.5 or more times the thickness t1 causes the magnetic field in the inter-magnetic-pole portions to be significantly magnified, and can therefore further improve the accuracy of position detection.

In addition, the first to ninth embodiments have been described in terms of example configurations in which the thickness t2 of all of the inter-magnetic-pole portions is greater than the thickness t1. However, the sensor magnet may be configured to have a relationship t1<t2, where t1 is a thickness at the center of one of the multiple magnetic poles, and t2 is a thickness of the inter-magnetic-pole portions adjacent to this magnetic pole. Even this configuration can offer an advantage similar to the advantage of the first embodiment, and at the same time, reduction in the amount of magnet material for forming the protrusions is achieved to be able to further reduce the cost. Moreover, by this configuration, it is possible to realize advantage of reducing a possibility that detection of a magnetic pole position is affected during motor rotation, even if a magnetic pole pitch is not correct in the circumferential direction of the sensor magnet.

The configurations described in the foregoing embodiments are merely examples of various aspects of the present invention. These configurations may be combined with a publicly known other techniques, and moreover, a part of each configuration may be omitted and/or modified without departing from the spirit of the present invention.

The invention claimed is:

1. A cylindrical rotor having a first end face and a second end face comprising:
   a disk-shaped sensor magnet having a plurality of magnetic poles disposed circumferentially with respect to an axis of the sensor magnet and having a third end face and a fourth end face; and
   a magnetic sensor disposed to face the fourth end face and detecting a rotating position of the disk-shaped sensor magnet, wherein
   the third end face faces the first end face,
   when a thickness of each of the magnetic poles in an axial direction of the sensor magnet is a first thickness and a thickness of an inter-magnetic-pole portion, which is located between adjacent magnetic poles among the plurality of magnetic poles, in the axial direction of the sensor magnet is a second thickness, the second thickness is larger than the first thickness,
   the axial direction of the sensor magnet corresponds to an axial direction of the cylindrical rotor,
   the sensor magnet includes a protrusion on the third end face in the inter-magnetic-pole portion at a location of the second thickness, and
   the protrusion protrudes in the axial direction of the sensor magnet.

2. A cylindrical rotor having a first end face and a second end face comprising:
   a disk-shaped sensor magnet having a plurality of magnetic poles disposed circumferentially with respect to an axis of the sensor magnet and having a third end face and a fourth end face; and
   a magnetic sensor disposed to face the fourth end face and detecting a rotating position of the disk-shaped sensor magnet, wherein
   the third end face faces the first end face,
   when a thickness of each of the magnetic poles in an axial direction of the sensor magnet is a first thickness and a thickness of an inter-magnetic-pole portion, which is located between adjacent magnetic poles among the plurality of magnetic poles, in the axial direction of the sensor magnet is a second thickness, the second thickness is larger than the first thickness,
   the axial direction of the sensor magnet corresponds to an axial direction of the cylindrical rotor, and
   the sensor magnet includes a protrusion in the axial direction of the sensor magnet on the fourth end face in the inter-magnetic-pole portion at a location of the second thickness.

3. A cylindrical rotor having a first end face and a second end face comprising:
   a disk-shaped sensor magnet having a plurality of magnetic poles disposed circumferentially with respect to an axis of the sensor magnet and having a third end face and a fourth end face; and
   a magnetic sensor disposed to face the fourth end face and detecting a rotating position of the disk-shaped sensor magnet, wherein
   the third end face faces the first end face,
   when a thickness of each of the magnetic poles in an axial direction of the sensor magnet is a first thickness and a thickness of an inter-magnetic-pole portion, which is located between adjacent magnetic poles among the plurality of magnetic poles, in the axial direction of the sensor magnet is a second thickness, the second thickness is larger than the first thickness,
   the axial direction of the sensor magnet corresponds to an axial direction of the cylindrical rotor, and
   the sensor magnet includes:
      a protrusion in the axial direction of the sensor magnet on the third end face in the inter-magnetic-pole portion at the location of the second thickness; and
      a protrusion in the axial direction of the sensor magnet on the fourth end face in the inter-magnetic-pole portion at a location of the second thickness.

4. The rotor according to claim 1, wherein
   the inter-magnetic-pole portion is one of a plurality of inter-magnetic-pole portions by which a magnetic pole detected by the magnetic sensor is changed from N-pole to S-pole when the sensor magnet rotates in one direction, and
   the protrusion is one of a plurality of protrusions, and each protrusion is on the third end face in one of the inter-magnetic-pole portions.

5. The rotor according to claim 1, wherein
   the inter-magnetic-pole portion is one of a plurality of inter-magnetic-pole portions by which a magnetic pole detected by the magnetic sensor is changed from S-pole to N-pole when the sensor magnet rotates in one direction, and
   the protrusion is one of a plurality of protrusions, and each protrusion is on the third end face in one of the inter-magnetic-pole portions.

6. The rotor according to claim 2, wherein
   the inter-magnetic-pole portion is one of a plurality of inter-magnetic-pole portions by which a magnetic pole detected by the magnetic sensor is changed from N-pole to S-pole when the sensor magnet rotates in one direction, and
   the protrusion is one of a plurality of protrusions, and each protrusion is on the fourth end face in one of the inter-magnetic-pole portions.

7. The rotor according to claim 2, wherein
   the inter-magnetic-pole portion is one of a plurality of inter-magnetic-pole portions by which a magnetic pole detected by the magnetic sensor is changed from S-pole to N-pole when the sensor magnet rotates in one direction; and
   the protrusion is one of a plurality of protrusions, and each protrusion is on the fourth end face in one of the inter-magnetic-pole portions.

8. The rotor according to claim 1, wherein
   the protrusion is one of a plurality of protrusions disposed on the third end face,
   the protrusions are circumferentially spaced apart from each other, and
   the protrusions each extend from the third end face toward the first end face, and a tip of each of the protrusions is in contact with the first end face of the rotor.

9. The rotor according to claim 8, wherein the tip of each of the protrusions in contact with the first end face of the rotor has a flat shape parallel to the first end face.

10. The rotor according to claim 8, wherein
the rotor includes a plurality of recesses on the first end face, and
in each of the recesses, the tip of one of the protrusions in contact with the first end face of the rotor is inserted.

11. The rotor according to claim 8, wherein the sensor magnet includes at least three protrusions that are in contact with the first end face of the rotor.

12. The rotor according to claim 1, wherein the sensor magnet is a ring-shaped element disposed on the first end face of the rotor.

13. The rotor according to claim 1, wherein, when θ represents an angle of a range in which a thickness of each of the magnetic poles in the axial direction of the sensor magnet is the first thickness, and N represents the number of magnetic poles of the sensor magnet, with a center of the sensor magnet in a radial direction of the sensor magnet being centered, the angle θ has a value satisfying θ<230/N [deg].

14. The rotor according to claim 1, wherein the second thickness is 1.5 or more times the first thickness.

15. The rotor according to claim 1, wherein the sensor magnet is configured such that, among the magnetic poles, a thickness of one magnetic pole in the axial direction of the sensor magnet is the first thickness, and a thickness of the inter-magnetic-pole portion, which is adjacent to the one magnetic pole in the axial direction of the sensor magnet, is the second thickness.

16. A method for manufacturing a permanent-magnet synchronous motor, the method comprising:
a step of producing a cylindrical rotor having an axis, a first end face and a second end face;
a step of producing a disk-shaped sensor magnet, which has
an axis, wherein a direction of the axis of the disk-shaped sensor magnet is the same as that of the axis of the cylindrical rotor,
a plurality of magnetic poles disposed circumferentially with respect to the axis of the sensor magnet, and
a third end face and a fourth end face, wherein
when a thickness of each of the magnetic poles in an axial direction of the rotor is a first thickness and a thickness of an inter-magnetic-pole portion located between adjacent magnetic poles among the magnetic poles in the axial direction of the rotor is a second thickness, the second thickness is larger than the first thickness; and
a step of attaching the rotor and the sensor magnet to a rotary shaft so that the third end face faces the first end face.

17. A permanent-magnet synchronous motor comprising:
the rotor according to claim 1; and
an annular stator core.

18. An air conditioner incorporating the permanent-magnet synchronous motor according to claim 17.

* * * * *